(12) United States Patent
Wong et al.

(10) Patent No.: US 12,464,394 B2
(45) Date of Patent: Nov. 4, 2025

(54) COMMUNICATIONS DEVICE, INFRASTRUCTURE EQUIPMENT AND METHODS FOR PERFORMING MEASUREMENTS IN A WIRELESS NETWORK

(71) Applicant: Sony Group Corporation, Tokyo (JP)

(72) Inventors: Shin Horng Wong, Basingstoke (GB); Martin Warwick Beale, Basingstoke (GB); Kazuyuki Shimezawa, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 349 days.

(21) Appl. No.: 17/795,557

(22) PCT Filed: Feb. 15, 2021

(86) PCT No.: PCT/EP2021/053671
§ 371 (c)(1),
(2) Date: Jul. 27, 2022

(87) PCT Pub. No.: WO2021/165209
PCT Pub. Date: Aug. 26, 2021

(65) Prior Publication Data
US 2023/0345279 A1 Oct. 26, 2023

(30) Foreign Application Priority Data
Feb. 21, 2020 (EP) ..................................... 20158902

(51) Int. Cl.
*H04W 24/10* (2009.01)
*H04B 17/309* (2015.01)
(Continued)

(52) U.S. Cl.
CPC .......... *H04W 24/10* (2013.01); *H04B 17/309* (2015.01); *H04W 72/0446* (2013.01); *H04W 72/232* (2023.01)

(58) Field of Classification Search
CPC ..... H04W 24/08; H04W 24/10; H04W 72/23; H04W 72/231; H04W 72/232;
(Continued)

(56) References Cited

U.S. PATENT DOCUMENTS

2020/0029315 A1  1/2020  Lin et al.
2021/0320776 A1* 10/2021 Aiba ...................... H04L 1/0061
2023/0052478 A1*  2/2023  Ren ........................ H04B 7/088

FOREIGN PATENT DOCUMENTS

KR  10-2021-0021538 A  2/2021
WO  2020/017240 A1    1/2020
WO  2021/160755 A1    8/2021

OTHER PUBLICATIONS

International Search Report and Written Opinion mailed on May 14, 2021, received for PCT Application PCT/EP2021/053671, filed on Feb. 15, 2021, 10 pages.
(Continued)

*Primary Examiner* — Peter Chen
(74) *Attorney, Agent, or Firm* — XSENSUS, LLP

(57) ABSTRACT

A method of operating a communications device, the method comprising: receiving reference signals transmitted by the infrastructure equipment on a wireless access interface, receiving downlink control information (DCI) transmitted by the infrastructure equipment to the communications device and each of one or more other communications devices which together form a group of communications devices, the DCI indicating whether each of the respective communications devices of the group is to transmit a channel measurement report, and in response to receiving the DCI, determining, based on the DCI, communications
(Continued)

resources for transmitting the channel measurement report, generating a channel measurement report based on the received reference signals, and transmitting the channel measurement report using the determined communications resources.

19 Claims, 10 Drawing Sheets

(51) Int. Cl.
*H04W 72/0446* (2023.01)
*H04W 72/232* (2023.01)

(58) Field of Classification Search
CPC ......... H04W 72/0446; H04W 72/0453; H04W 72/30; H04W 48/12; H04W 74/002; H04W 74/006; H04L 5/0048; H04L 5/0053; H04L 5/0057; H04L 1/0026; H04L 1/0016; H04L 1/0003; H04L 1/0009; H04B 17/309; H04B 7/0626; H04B 7/0632
See application file for complete search history.

(56) References Cited

OTHER PUBLICATIONS

Intel Corporation, "Views on evaluation methodology and Layer 1 enhancements for Rel-16 eURLLC", 3GPP TSG RAN WG1 Meeting #94, R1-1808705, Aug. 20-24, 2018, pp. 1-10.

Huawei et al., "UCI enhancements for URLLC", 3GPP TSG RAN WG1 Ad-Hoc Meeting 1901, R1-1900044, Jan. 21-25, 2019, 8 pages.

Huawei et al., "Physical layer enhancements for NR ultra-reliable and low latency communication (URLLC)", 3GPP TSG RAN Meeting #83, RP-190726, Mar. 18-21, 2019, 5 pages.

3GPP, "Study on Scenarios and Requirements for Next Generation Access Technologies; (Release 15)", 3GPP TR 38.913 V15.0.0, Jun. 2018, pp. 1-39.

Ericsson, "Remaining Details in UL Transmission Procedures", 3GPP TSG RAN meeting #92, R1-1802913, Feb. 26-Mar. 2, 2018, 8 pages.

Holma et al., "LTE for UMTS OFDMA and SC-FDMA Based Radio Access", John Wiley & Sons, 2009, pp. 25-27.

Nokia et al., "Revised SID: Study on NR Industrial Internet of Things (Iot)", 3GPP TSG RAN meeting #81, RP-182090, Sep. 10-13, 2018, 5 pages.

Nokia et al., "Enhanced Industrial Internet of Things (IoT) and URLLC support", 3GPP TSG RAN Meeting #86, RP-193233, Dec. 9-12, 2019, 5 pages.

3GPP, "NR; Physical layer procedures for data (Release 16)", 3GPP TS 38.214 V16.0.0, Dec. 2019, pp. 1-147.

3GPP, "Study on Scenarios and Requirements for Next Generation Access Technologies; (Release 14)", 3GPP TR 38.913 V14.3.0, Jun. 2017, pp. 1-39.

* cited by examiner

COMMUNICATIONS DEVICE, INFRASTRUCTURE EQUIPMENT AND METHODS FOR PERFORMING MEASUREMENTS IN A WIRELESS NETWORK

CROSS-REFERENCE TO RELATED APPLICATIONS

The present application is based on PCT filing PCT/EP2021/053671, filed Feb. 15, 2021, which claims priority to EP 20158902.5, filed Feb. 21, 2020, the entire contents of each are incorporated herein by reference.

BACKGROUND

Field

The present disclosure relates to communications devices, infrastructure equipment and methods for transmitting channel measurement reports in a wireless communications network.

Description of Related Art

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to support efficiently communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Systems incorporating NR technology are expected to support different services (or types of services), which may be characterised by different requirements for latency, data rate and/or reliability. For example, a target for the Enhanced Mobile Broadband (eMBB) service is to provide a reliability of 10% with a user plane latency of 4 ms and a target for the Ultra Reliable & Low Latency Communications (URLLC) services is to provide a reliability of $1-10^{-5}$ (99.999%) or higher for one transmission of a 32 byte packet with a user plane latency of 1 ms [3]. In addition, systems may be expected to support further enhancements related to the Industrial Internet of Things (IIoT) in order to support services with new requirements of high availability, high reliability, low latency, and in some cases, high-accuracy positioning.

There is also a desire to provide low-cost user equipment for use in such networks. Cost of a user equipment may be reduced by limiting a number of antennas, limiting a transmit and/or receive bandwidth, and/or simplifying or omitting other hardware typically associated with a user equipment.

There is thus a need to provide user equipment, which may have low complexity (see e.g. [4]) which is nevertheless able to deliver services provided in a wireless communications network, such as those described above. A key requirement of wireless communications is link adaptation and there is accordingly a need to provide an efficient means of requesting and transmitting channel measurement information.

SUMMARY

The present disclosure can help address or mitigate at least some of the issues discussed above.

Example embodiments of the present technique can provide a method of operating a communications device, the method comprising: receiving reference signals transmitted by the infrastructure equipment on a wireless access interface, receiving downlink control information (DCI) transmitted by the infrastructure equipment to the communications device and each of one or more other communications devices which together form a group of communications devices, the DCI indicating whether each of the respective communications devices of the group is to transmit a channel measurement report, and in response to receiving the DCI, determining, based on the DCI, communications resources for transmitting the channel measurement report, generating a channel measurement report based on the received reference signals, and transmitting the channel measurement report using the determined communications resources.

Embodiments can provide for an efficient transmission of signalling for requesting channel measurement reports from a plurality of communications devices.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
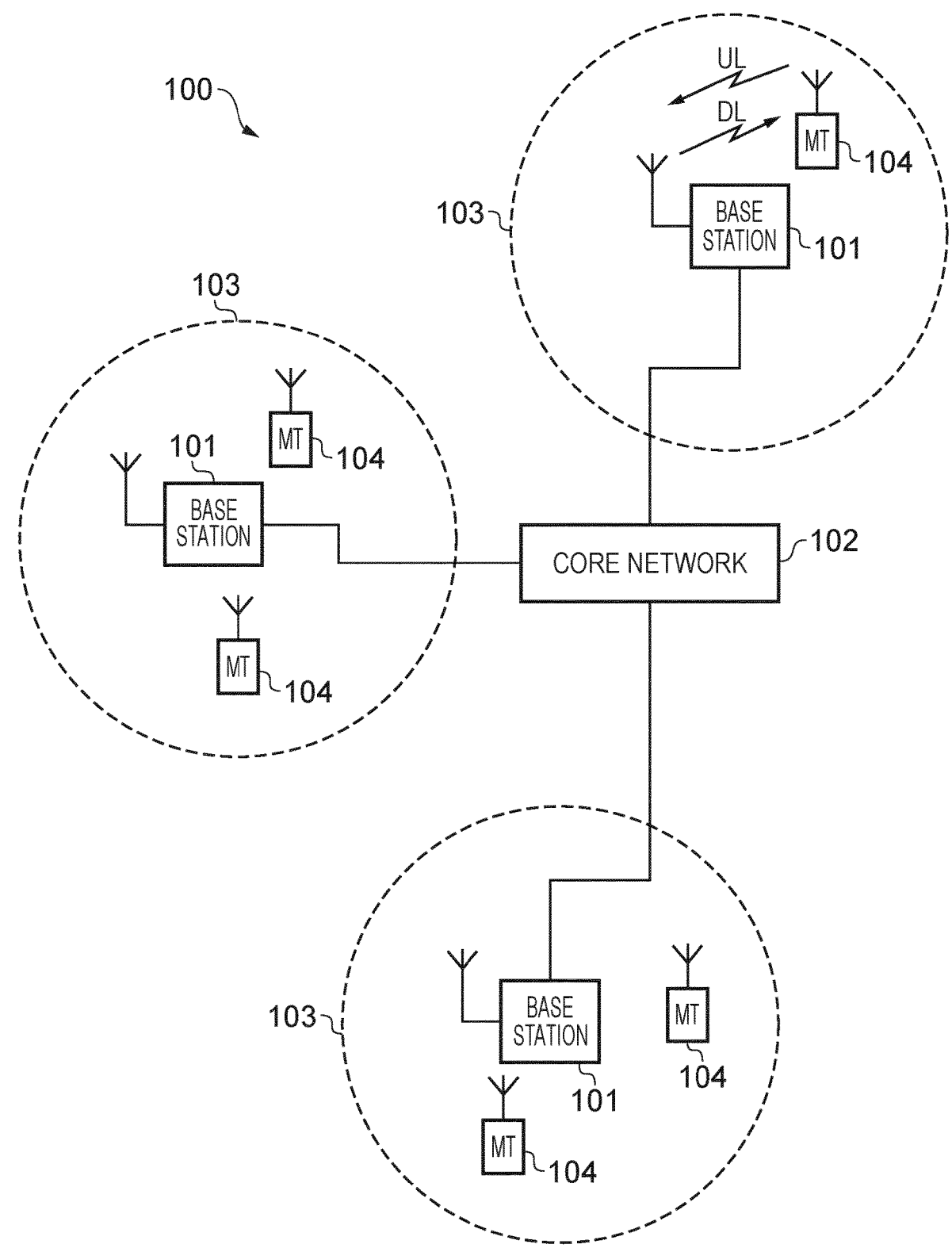
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
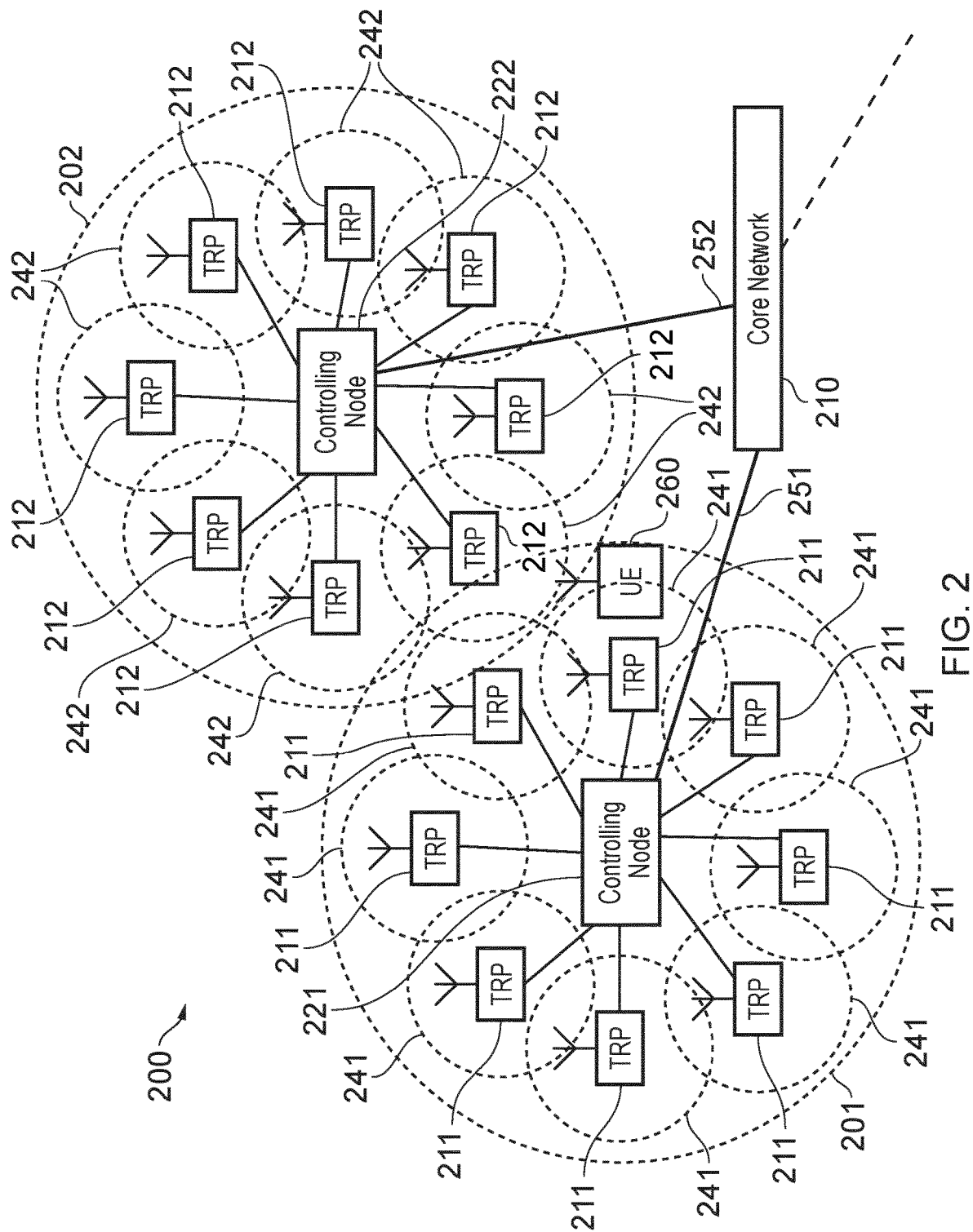
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
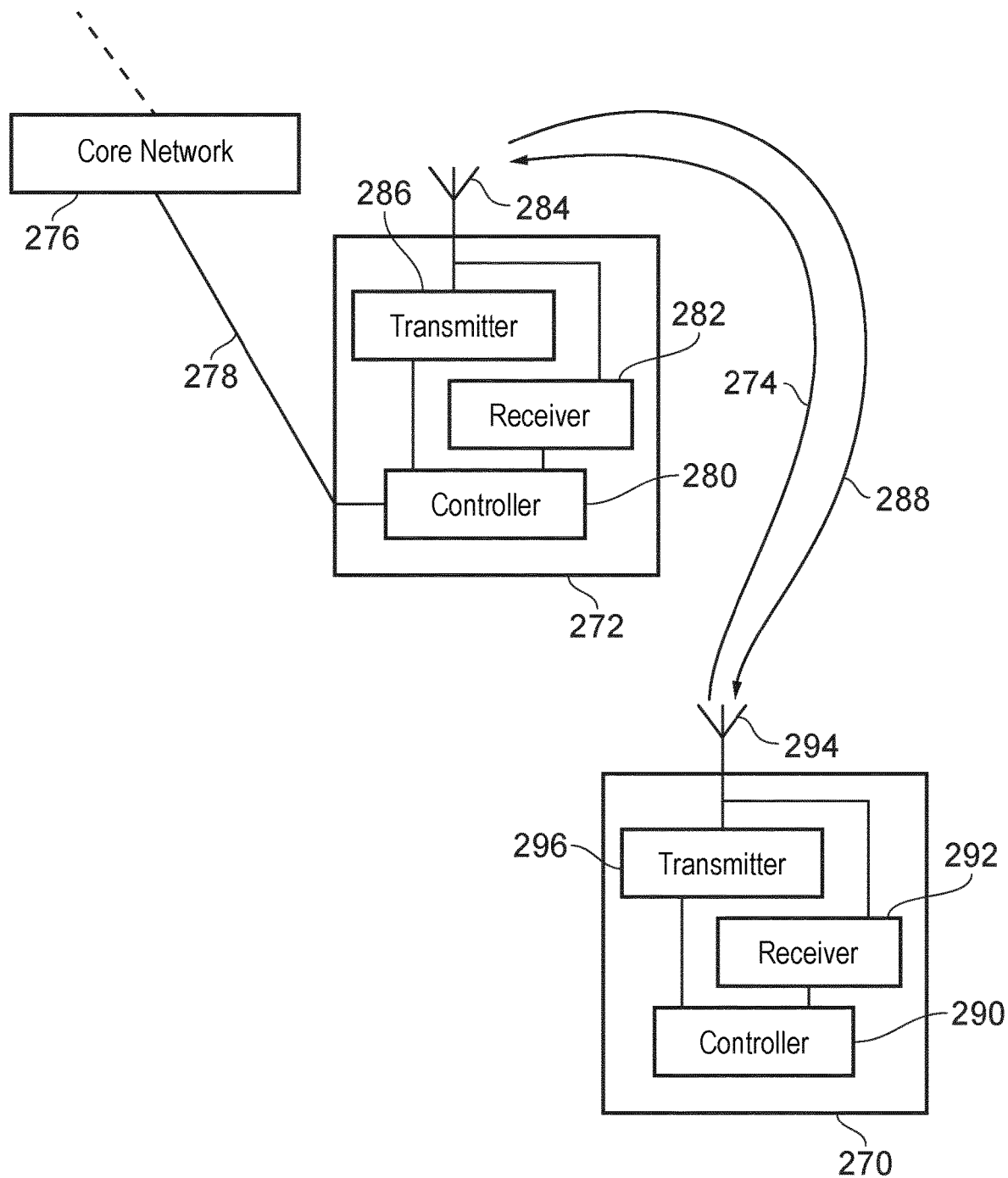
FIG. 3 is a schematic block diagram of an example infrastructure equipment and communications device which may be configured in accordance with example embodiments.

A more detailed illustration of a UE/communications device 270 (which may correspond to a communications device such as the communications device 260 of FIG. 2 or the communications device 104 of FIG. 1) and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via uplink resources of a wireless access interface as illustrated generally by an arrow 274 from the UE 270 to the infrastructure equipment 272. The UE 270 may similarly be configured to receive downlink data transmitted by the infrastructure equipment 272 via downlink resources as indicated by an arrow 288 from the infrastructure equipment 272 to the UE 270. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Channel State Information Feedback and Link Adaptation

Transmissions on the wireless access interface may use one of a number of different modulation and coding schemes (MCS). Broadly, the different modulation and coding schemes vary according to how efficiently they are able to encode data (i.e. how much communication resources are required per bit of unencoded data) and the resiliency of the coding to decoding errors (i.e. how likely it is that the recipient is able to successfully receive and decode the encoded data).

The selection of MCS is particularly important where communication resources are scarce, such as when multiple transmissions of different data occur within a relatively short timescale. An appropriate MCS selection can minimise the amount of communication resources consumed by the transmission of the data, while meeting reliability requirements (e.g. block error rate) for the data transmission.

The selection of an appropriate MCS for transmission of data using a particular wireless channel between a transmitter and receiver may be referred to as link adaptation. Link adaptation can be carried out based on block-by-block feedback (e.g. acknowledgement information). However, such link adaptation can be slow and ineffective particularly when the required reliability is very high.

Conventionally, link adaptation may also occur based on feedback based on channel measurements made by the receiver. As an example, a receiver may perform channel measurements based on reference signals transmitted by the transmitter. The receiver may then transmit a channel information report based on the channel measurements, allowing the transmitter to make an improved MCS selection.

In some technologies, such as 3GPP LTE and 3GPP 5G 'NR', the channel information report may comprise a channel quality index (CQI). To determine the channel quality index, the receiver may select, based on the channel measurements, an MCS from a plurality of predetermined MCSs. The selected MCS may be a most efficient MCS such that, if that MCS is used by the transmitter to encode a block of data, the probability that the block of data will not be received and decoded successfully by the receiver is not more than a predetermined probability. In other words, the CQI indicates one of the predetermined plurality of MCSs which is likely to result in an expected error rate (e.g. block error rate) of data communicated via the wireless access interface from the infrastructure equipment to the communications device, when the indicated MCS is used, being less than a predetermined value. Preferably, the CQI indicates the most efficient of such MCSs which meet this criterion.

The channel quality index may indicate the selected MCS. In accordance with some conventional techniques, the predetermined probability may be 10% or may be $10^{-5}$.

The transmitter (e.g. the infrastructure equipment) may take into account the indicated channel quality index in selecting an MCS for the encoding and transmission of subsequent data via the wireless channel.

Because the channel quality index is determined by the receiver, it can take into account the capabilities and performance of the receiver with respect to its ability to receive and decode data transmitted using the wireless channel Preferably, the time between the transmission of the reference signals and the subsequent transmission of data is minimised, so that the effect of any change in time of the wireless channel is minimised.

In order to minimize this delay, a conventional technique involves the transmitter (e.g. infrastructure equipment) transmitting a one-off request for the receiver to report a channel quality index, shortly before the transmitter is about to transmit data to the receiver. The one-off request may comprise, for example, downlink control information requesting the receiver to send the channel quality index and indicating communication resources for the transmission of the channel quality index. However, this can be an inefficient use of communication resources.

Figure 4:
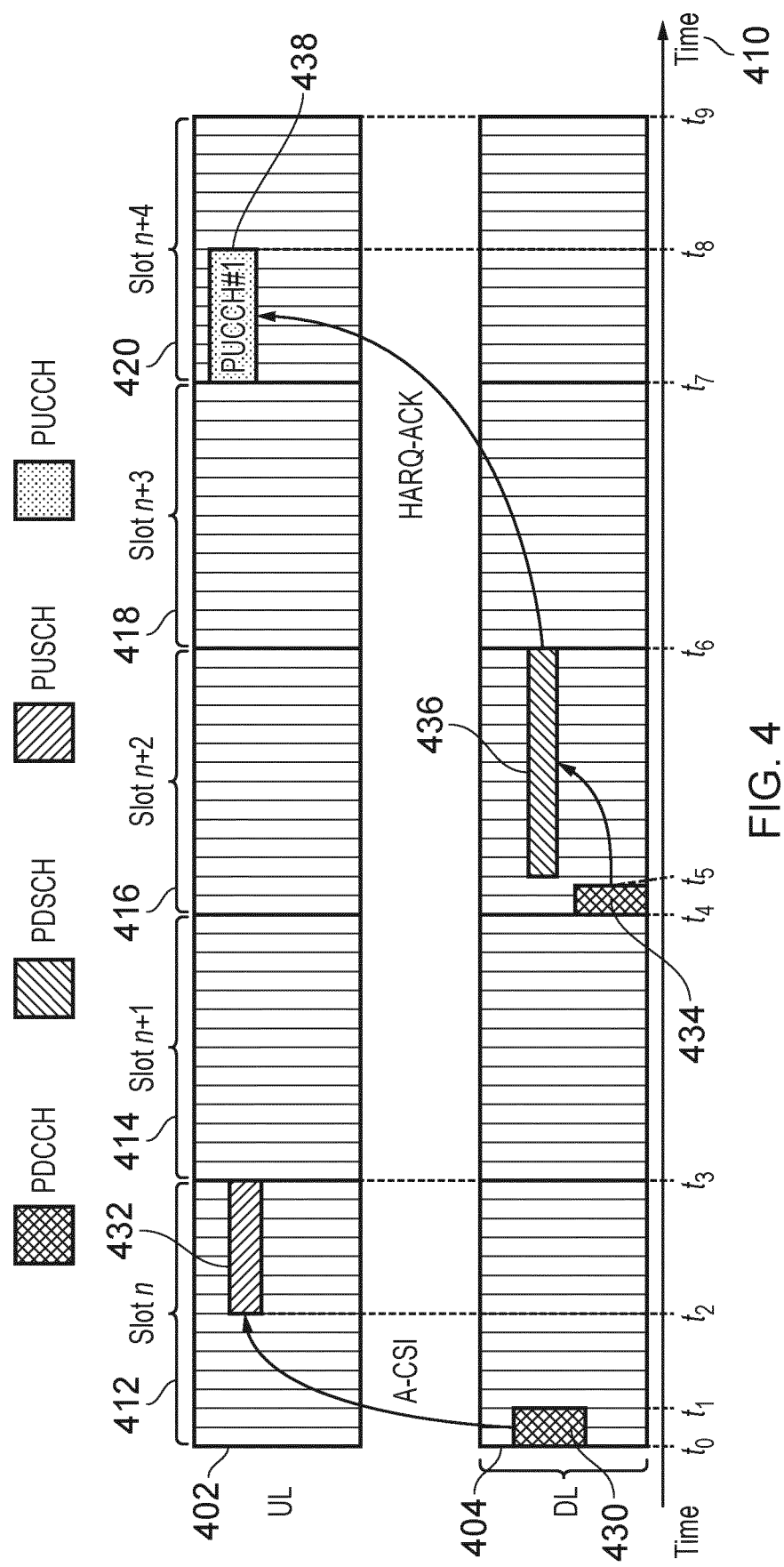
FIG. 4 shows such a conventional technique for the sending of a channel quality index and for the subsequent transmission of data.

FIG. 4 shows such a conventional technique for the sending of a channel quality index and for the subsequent transmission of data.

FIG. 4 shows communication resources of an uplink 402 of a wireless access interface and communication resources of a downlink 404 of the wireless access interface, the wireless access interface provided by the infrastructure equipment 272. In the example of FIG. 4, the wireless access interface is a frequency division duplex wireless access interface, provided by an infrastructure equipment of a wireless communications network, which may be generally referred to herein as the 'transmitter' (being the transmitter of the encoded data); the terms 'infrastructure equipment' and 'transmitter' are therefore used interchangeably.

In the example of FIG. 4, the 'receiver' of the encoded data is a communications device, such as the communications device 270, and the terms 'receiver' and 'communications device' are accordingly used interchangeably.

However, embodiments of the present disclosure are not limited to such configurations. For example, the wireless access interface may be a time division duplex wireless access interface, and the transmitter and receiver may be any devices capable of communicating via a wireless access interface, such as via a device-to-device or group communications wireless access interface.

In the example of FIG. 4, the wireless access interface is divided in the time domain 410 into time slots 412, 414, 416, 418, 420.

During the first time slot 412, the infrastructure equipment 272 transmits, at time to, first downlink control information (DCI) 430 to the communications device 270. The first DCI 430 comprises an indication of allocated first uplink communications resources 432 and a request for the communications device 270 to transmit, using the allocated first uplink communications resources 432, a channel quality index based on measurements of downlink reference signals (not shown in FIG. 4).

In response, at time t2, the communications device 270 transmits, using the allocated first uplink communications resources 432, an indication of the channel quality index (CQI). As described above, the CQI is determined based on measurements of reference signals transmitted by the infrastructure equipment 272, and is further based on a predetermined plurality of MCSs and a predetermined reliability/probability of successful reception and decoding.

Subsequently, at time t4, the infrastructure equipment 272 transmits second DCI 434. The second DCI 434 indicates an allocation of downlink communication resources 436 for the transmission of encoded data to the communications device 270, and an allocation of second uplink communication resources 438 for the transmission of acknowledgement information.

The infrastructure equipment 272 encodes the data using an MCS which is selected based on the CQI indicated by the communications device 270. Accordingly, the selection of the downlink communication resources 436 may also be based on the CQI, because the selected MCS may determine the extent of communication resources required to transmit the encoded data.

The encoded data is transmitted using the downlink communication resources 436 starting at time t5. The communications device 270 receives the encoded data and attempts to decode it, in accordance with the selected MCS. The manner by which the communications device 270 determines the selected MCS is not relevant to the present disclosure, but the skilled person will appreciate that many conventional techniques are suitable; for example, the second DCI 434 may indicate the selected MCS and/or the communications device 270 may use blind decoding of some or all of the data.

At time t7, the communications device 270 transmits acknowledgement information using the second uplink communication resources 438. The acknowledgement information indicates whether the communications device 270 successfully decoded the data transmitted using the downlink communications resources 436. The communications device 270 may determine whether it successfully decoded the data based on known techniques, such as using a cyclic redundancy check or parity check.

In the example of FIG. 4, the transmission of the channel quality index is in response to an explicit request from the infrastructure equipment 272 for a single CQI report. As such, it may be referred to as an 'aperiodic' CQI report. An alternative conventional technique is to require the receiver to send periodic reports comprising the latest channel quality index. Although this technique can avoid the need for DCI signalling to request each CQI report, this technique can also be inefficient, particularly if the data is sporadic, since many of the reports may never be used.

Recent proposals have suggested that communications be provided with high reliability and very low latency, suitable for applications such as factory automation, transport, electrical power distribution, using a wireless communications network, as described in [4], which proposed an 'eURLLC' service suitable for such applications. Further developments are described in [5] which sets out objectives for further enhancements to the eURLLC service.

Proposals for transmitting one-off (aperiodic) channel measurement reports are disclosed in [6], [7].

As discussed above, the selection of an MCS is particularly important where a large amount of data is to be transmitted, such as where data is to be transmitted to multiple communication devices. Accordingly, there is a need for techniques which can provide an efficient and timely reporting of channel quality by multiple communications devices. There is also a need to avoid multiple communications resources transmitting using the same communications resources.

Embodiments of the present technique can provide a method of operating a communications device, the method comprising: receiving reference signals transmitted by the infrastructure equipment on a wireless access interface, receiving downlink control information (DCI) transmitted by the infrastructure equipment to the communications device and each of one or more other communications devices which together form a group of communications devices, the DCI indicating whether each of the respective communications devices of the group is to transmit a channel measurement report, and in response to receiving the DCI, determining, based on the DCI, communications resources for transmitting the channel measurement report, generating a channel measurement report based on the received reference signals, and transmitting the channel measurement report using the determined communications resources.

Embodiments of the present technique can allow a single indication to be transmitted which addresses multiple communications devices, and may allow the multiple communications devices to select different communications resources for the transmission of channel measurement reports.

Embodiments of the present technique can provide an efficient means of requesting reliable aperiodic channel state information from multiple communications devices.

Allocating Resources for UEs to Transmit Measurement Reports

According to some embodiments of the present technique, a single instance of downlink control information (DCI) can indicate to a group of communications devices whether, for each communications device within the group, a channel measurement report (CMR) is requested. Communications resources for the transmission of the requested channel measurement reports are allocated such that not all requested channel measurements reports are transmitted using the same communication resources.

Preferably, the resources for each requested channel measurement information report are orthogonal.

An example of a channel measurement report is a report comprising channel state information. More particularly, the channel measurement report may comprise a channel quality index.

A communications device which receives a DCI requesting a CMR may have previously received an indication of one of more communication resources allocated for the purpose of transmitting such a requested CMR, or of how to determine the allocated communication resources. This indication may be an example of a channel measurement report resource indication (CMRRI).

An example of a CMR is a channel state information (CSI) report, which may comprise a CQI indication, as described above.

Figure 5:
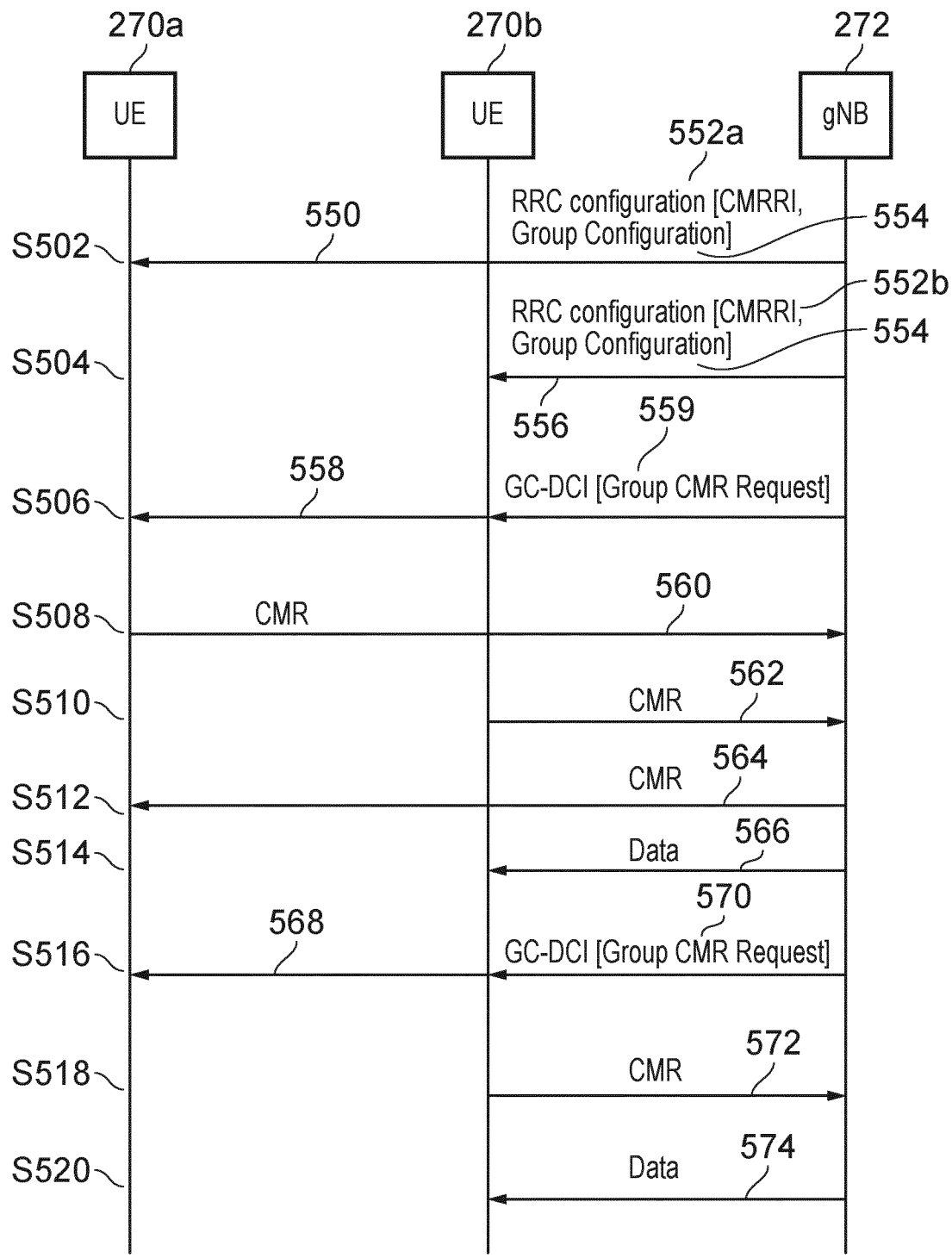
FIG. 5 is a message sequence chart illustrating the transmission of channel measurement reports in accordance with embodiments of the present technique.

FIG. 5 is a message sequence chart illustrating the transmission of channel measurement reports in accordance with embodiments of the present technique.

FIG. 5 shows the infrastructure equipment 272 and two communications devices, first communications device 270a and second communications device 270b. The infrastructure equipment 272 selects the first and second communications devices 270a, 270b to form a group. It will be appreciated that the number of communications devices in the group may be different from two.

The sequence of FIG. 5 starts at step S502 in which the infrastructure equipment 272 transmits a first radio resource control (RRC) configuration message 550 to the first communications device 270a. The first RRC configuration message 550 comprises a first channel measurement report resource indication (CMRRI) 552a and a group configuration indication 554.

The first channel measurement report resource indication (CMRRI) 552a provides information that allows the first communications device 270a to determine communication resources for transmitting a single (aperiodic) CMR report, which is an example of a channel measurement report. For example, the aperiodic CMR report may be transmitted in response to a subsequent group common downlink control information (GC-DCI), as described below.

Figure 6:
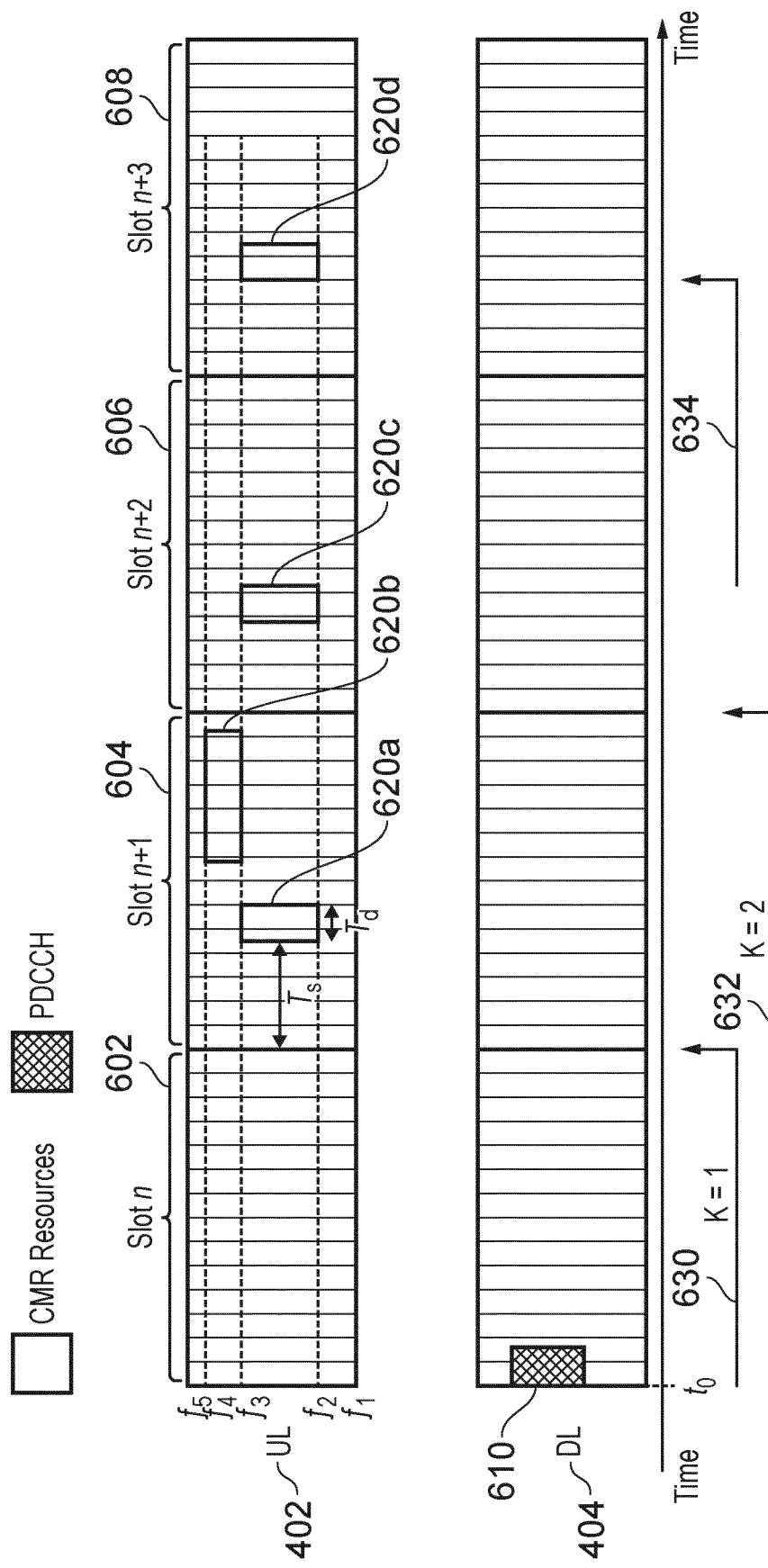
FIG. 6 illustrates parameters which may be indicated by a channel measurement report resource indication in accordance with embodiments of the present technique.

FIG. 6 illustrates parameters which may be indicated by the first CMRRI 552 in accordance with embodiments of the present technique.

FIG. 6 shows the uplink 402 of the wireless access interface and the downlink 404 of the wireless access interface. The wireless access interface is divided in time into time slots 602, 604, 606 and 608. Parameters indicated by the CMRRI may permit a communications device to determine communication resources (referred to herein as CMR resources) of the uplink 402 of the wireless access interface for transmitting an aperiodic channel measurement report, in response to an explicit request transmitted by the infrastructure equipment, such as the explicit request 610 transmitted in the first slot 602.

The CMRRI may indicate a single CMR resource, or multiple CMR resources. An indication of CMR resources in the CMRRI may be a 'relative' resource indication. That is, the CMR resources may be defined with respect to a future time instant, which is not known when the CMRRI is received. The future time instant may be, for example, the end of transmission of an explicit request (such as the explicit request 610) or the start of a slot following a slot in which the explicit request was received.

Each CMR resource may be characterised by frequency resources (e.g. physical resource blocks), a start time offset and an end time offset. In the example of FIG. 6, the CMRRI (not shown) indicates three CMR resources. These are 'relative' resource indications and FIG. 6 shows the first to third CMR resources 620*a-c* based on an explicit request 610 transmitted in a first timeslot 602. The indication of the first CMR resources 620*a* comprises a frequency indication indicating frequency resources between frequency f2 and frequency f3, a start time indication (comprising a slot offset K and a start time offset $T_S$) and a duration $T_D$. The slot offset K for the first CMR resources 620*a* is equal to 1 in the example of FIG. 6.

The CMRRI in the example also indicates second and third CMR resources, characterised by respective start time offsets and end time offsets. Frequency resources and slot offsets may be as follows:

Second CMR resources 620*b*: Frequency resources from f3 to f4, K=1

Third CMR resources 620*c*: Frequency resources from f2 to f3, K=2

The CMR resources 620 may be resources on a control channel, such as a physical uplink control channel (PUCCH) or on shared resources such as on a physical uplink shared channel (PUSCH). The CMRRI may indicate for each of the CMR resources whether the resources are on a control channel or on a shared channel or on a mixture of both. In some embodiments, when the resources are on a shared channel (such as a PUSCH) then the CMR may be transmitted together with other (e.g. user) data.

In some embodiments, the CMR resources are a subset (or instance) of periodic communication resources which are semi-statically configured. For example, the CMRRI may indicate that the CMR resources may be using a particular PUCCH. The PUCCH may be configured semi-statically (e.g. by RRC configuration) to occur, for example, only every five slots. In some embodiments, for example, the periodic PUCCH resources may be those configured for periodic transmissions of CMRs (such as for periodic CSI transmissions). Similarly, the CMR resources may be using PUSCH resources which are configured semi-statically by means of, for example, a configured grant or by semi-persistent scheduling.

In such embodiments, depending on the value K and the slot in which the explicit request is transmitted, there may be no instance of the periodic communication resources within the slot indicated by the K value. In some such embodiments, the CMR resources are those of the periodic communications resources which occur first of those occurring during, or after, the slot determined based on the explicit request 610 and the K value.

For example, fourth communications resources 620*d* may be defined in the example of FIG. 6 as being selected from PUSCH resources which occur every 5 slots and associated with a slot offset K value of 2. If the explicit request 610 is received in the first slot 602, then according to the K value of 2, the CMR resources occur in the third slot 606 (as indicated by the arrow 632). However, none of the periodic PUSCH resources occur during the third slot 606. The next instance of the periodic PUSCH resources occurs during the fourth slot 608. Accordingly, the fourth CMR resources 620*d* are the communication resources within the periodic PUSCH resources within the fourth slot 608 (as indicated by the arrow 634).

By using already-configured periodic communication resources, less information can be included in the CMRRI; for example, one or more of the frequency range, start time offset and duration may be omitted and replaced with a reference to the periodic communication resources.

Where the CMRRI indicates a plurality of CMR resources (such as first to fourth CMR resources 620*a-d*), which of the plurality of CMR resources are to be selected for the transmission of the CMR may be indicated by the explicit request 610, for example by a CMR index indication, where the CMRRI further indicates (explicitly or implicitly) an index associated with each of the indicated CMR resources, and the explicit request indicates an index associated with one of the CMR resources.

A further CMR index may be associated with an absence of a request for a CMR.

In the example of FIG. 6, the first to fourth CMR resources 620*a-d* are associated with index values of 1 to 4 respectively, and the explicit request 610 indicates an index value of 1. Accordingly, in response to receiving the explicit request 610 in the first slot 602, and based on the CMRRI, the communications device determines that the uplink resources for transmitting the CMR are within the second slot 604 (because K=1, the uplink resources are in the slot immediately following that in which the explicit request 610 is received, as shown by the arrow 630). Based on the frequency indication, the start time offset $T_S$ and the duration $T_D$, the communications device identifies the first CMR resources 620*a* for transmitting the CMR.

Preferably, the CMRRI indicates 3 CMR resources, and one of four index values is included in the explicit indication to indicate one of the 3 CMR resources or that no CMR is requested. Accordingly, embodiments of the present technique can provide for an indication which requires only 2 bits per communications device in the group.

In some embodiments (unlike the example of FIG. 6), there is a one-to-one correspondence between the explicit request 610 and the CMR resources 620, based on the time at which the explicit request 610 is transmitted.

In some embodiments, an indication of the slot offset is indicated by the explicit request 610, instead of by the CMRRI.

Returning to FIG. 5, the group configuration indication 554 indicates one or more parameters which are common to a group of communications devices. These parameters allow the infrastructure equipment to transmit a single explicit request, which causes two or more communications devices in the group to transmit a CMR in response.

For example, the group configuration indication 554 may comprise a group radio network temporary identity, which may be referred to herein as a G-RNTI. The G-RNTI may be used to encode the explicit request, such as a GC-DCI. Accordingly, a single explicit request may be addressed to multiple communications devices.

At step S504, a second RRC configuration message 556 is transmitted to the second communications device 270b. The second RRC configuration message 556 comprises a second CMRRI 552b and the group configuration indication 554, which is the same as the group configuration indication 554 in the first RRC configuration message 550, because the first and second communications devices 270a, 270b are in the same group.

The second CMRRI 552b may be different from the first CMRRI 552a. In particular, when the first CMRRI 552a and the second CMRRI 552b each indicate only single CMR resources, the CMR resources indicated by each of the first CMRRI 552a and the second CMRRI 552b are preferably different. Accordingly, when a subsequent explicit request is transmitted to the group requesting both the first and the second communications devices 270a, 270b to transmit an aperiodic CMR, the aperiodic CMRs transmitted by the first and the second communications devices 270a, 270b are transmitted using different (e.g. orthogonal) resources.

As described above, in some embodiments, one or both of the first CMRRI 552a and the second CMRRI 552b indicate a plurality of CMR resources. The plurality of CMR resources indicated by the first CMRRI 552a may be the same as those indicated by the second CMRRI 552b or may be different.

In the example of FIG. 5, both of the first CMRRI 552a and the second CMRRI 552b indicate the first to third CMR resources 620a-c shown in FIG. 6 and described above.

Subsequently, but prior to step S506, the infrastructure equipment (such as the gNB 272) determines that it requires channel information associated with the respective downlink wireless channels between the infrastructure equipment 272 and the first and second communications devices 270a, 270b. This determination may be in response to a determination that the infrastructure equipment 272 has (or is about to receive) downlink data for transmission to the first and second communications devices 270a, 270b.

In response to this determination, the infrastructure equipment 272 determines that the first and second communications devices 270a, 270b are within the same group.

Accordingly, the infrastructure equipment 272 transmits a group explicit request 558 addressing all communications devices in the group, in this example both the first and second communications devices 270a, 270b. The group explicit request 558 may be a GC-DCI encoded using the G-RNTI indicated by the group configuration indication 554.

The group explicit request 558 comprises a first group channel measurement report (CMR) request 559, which indicates that both the first and second communications devices 270a, 270b are requested to transmit respective CMRs using CMR resources indicated in the respective first and second CMRRIs 552a, 552b.

In some embodiments where the first and/or second CMRRIs 552a, 552b indicate only a single CMR resource, there may be no further specification of the corresponding CMR resource in the first group CMR request 559.

In embodiments where the first and/or second CMRRIs 552a, 552b indicate a plurality of CMR resources, the first group CMR request 559 comprises an indication of which of the plurality of CMR resources is to be selected. For example, as described above, the first group CMR request 559 may comprise an indication of an index value associated with one of the indicated CMR resources. The index value may be the same for all communications devices 270 (particularly where the CMR resources associated with that index value in the CMRRIs are different).

In some embodiments, an index value is indicated for each of the communications devices within the group. In some such embodiments, the group configuration indication 554 may comprise specific information associated with the communications device 270 to which it is addressed, to indicate how the communications device is to determine which index value within the first group CMR request 559 it should use to determine its CMR resources.

For example, the first group CMR request 559 may comprise a list of index values, and the group configuration indications 554 sent to a particular communications device may comprise an indication of a position in the list at which the index value applicable to that communications device is included.

In some embodiments, a particular index value, not associated with any CMR resource, may indicate that no CMR is requested from a particular communications device. For example, an index value of 0 may indicate that no CMR is requested. Accordingly, the infrastructure equipment 272 is able to request CMRs from a subset of communications devices within the group.

In the example of FIG. 5, each of the CMRRIs 552a, 552b indicate the same plurality of CMR resources, and the same associated index values associated with each of the first to third CMR resources 620a-c. The group configuration indication 554 sent in step S502 to the first communications device 270a indicates that the first communications device 270a is to use the first index in the group CMR request 560, and the group configuration indication 554 sent in step S504 to the second communications device 270b indicates that the second communications device 270b is to use the second index in the group CMR request 560.

The first group CMR request 559 comprises a list of index values beginning 1, 3.

Accordingly, the first communications device 270a determines that it is to send a CMR using the CMR resources associated with index value 1, i.e. the first CMR resources 620a. In response to receiving the first group CMR request 559 comprising an indication that the first communications device is to transmit a CMR, the first communications device 270a generates a first CMR 560, based on measurements of received downlink reference signals transmitted by the infrastructure equipment 272 (not shown in FIG. 5).

At step S508, the first communications device 270a transmits the first CMR 560 using the first CMR resources 620a, that is, during the first time slot after the slot in which the group CMR request 558 was transmitted.

Based on the group CMR request 560, the second communications device 270b determines that it is to send a CMR using the CMR resources associated with index value 3, i.e. third CMR resources 620c. In response, the second communications device 270b generates a second CMR 562. At step S510, the second communications device 270b transmits the second CMR 562 using the third CMR resources 620c, that is, during the second time slot after the slot in which the group CMR request 558 was transmitted.

In the example of FIG. 5, the first and second CMRs 560, 562 include an indication of a CQI index, determined based on reference signals transmitted by the infrastructure equipment 272 and received by the first and second communications devices 270a, 270b, respectively. However, the present disclosure is not so limited, and it will be appreciated that the first and second CMRs 560, 562 may additionally or alternatively comprise other indications for assisting the infrastructure equipment 272 in performing link adaptation, such as signal measurement results (e.g. received signal strength, received signal quality) based on measurements of the received reference signals or on any other known suitable measure.

Based at least in part on the first CMR 560, the infrastructure equipment 272 performs link adaptation and selects parameters for the transmission of downlink data 564 to the first communications device 270a. The parameters may comprise modulation and/or coding scheme parameters. In some embodiments, the parameter may correspond to a predetermined MCS having an index corresponding to (or selected based on) a CQI index indicated by the first CMR 560.

The infrastructure equipment 272 encodes and modulates the downlink data 564 in accordance with the selected parameters and transmits the downlink data 564 at step S512.

Similarly, the infrastructure equipment performs link adaptation and selects parameters for the transmission of second downlink data 566 based at least in part on the second CMR 562, and transmits the encoded and modulated second downlink data 566 at step S514.

The transmission of the first and second downlink data 564, 566 may be in accordance with conventional data transmission techniques, for example using a hybrid automatic repeat request (HARQ) protocol for providing acknowledgement information (not shown in FIG. 5).

It will be appreciated that in some embodiments, no data is transmitted in response to receiving a CMR. For example, the CMR may be requested for reasons other than link adaptation, such as for assessing coverage of the infrastructure equipment 272 or for assessing reachability of a communications device 270.

Embodiments of the present technique can therefore provide for an efficient transmission of multiple aperiodic CMRs from multiple communications devices, the CMRs being transmitted using different communications resources. Only one request transmission is required to trigger the transmission of the multiple aperiodic CMRs.

FIG. 5 also illustrates a subsequent use of a group CMR request for requesting a CMR from a subset of communications devices in the group. In the example of FIG. 5, after step S514, the infrastructure equipment 272 may determine that a further CMR is required from the second communications device 270b, but that no further CMR is required from the first communications device 270a at this time.

In response, the infrastructure equipment 272 transmits a second group explicit request 568 addressing all the communications devices in the group. The second group explicit request 568 comprises a second group CMR request 570, which indicates that the second communications device 270b is requested to transmit a CMR and that the first communications device 270a is not requested to transmit a CMR.

At step S518, the second communications device 270b transmits a third CMR 572 in response to receiving the second group CMR request 570.

The first communications device 270a also receives the second group CMR request 570 at step S516 and, in response to determining that it indicates that no CMR is requested from the first communications device 270a, refrains from transmitting a further CMR.

The infrastructure equipment 270 may select modulation and coding scheme parameters based on the third CMR 572 and encode and modulate third data 574 based on the selected parameters. At step S520, the encoded and modulated third data 574 is transmitted to the second communications device 270b.

Embodiments of the present technique can therefore provide a flexible and efficient method of requesting CMRs from any subset of a plurality of communications devices within a group.

It will be appreciated that in some embodiments of the present technique, one or more of the steps shown in FIG. 5 may be omitted, or may be carried out in a different order. Additional steps (such as in respect of other communications devices 270 not shown) may be included in some embodiments.

Examples of the indication(s) included with the explicit indication e.g. within the group CMR requests 559, 570 will now be described.

In a first example, a pair of bits is included for each communications device 270 within the group. The pair of bits indicates, for the respective communications device, whether an aperiodic CMR is requested from that communications device and, if so, which communications resources are to be used. An example is shown in Table 1:

TABLE 1

Example of Explicit Request contents

| Bit Pattern | Resource Index | Slot Offset K |
|---|---|---|
| 00 | No CMR requested | n/a |
| 01 | 1 (PUCCH) | 1 |
| 10 | 2 (PUSCH) | 1 |
| 11 | 3 (PUCCH) | 2 |

As shown in the example of Table 1, in some embodiments, the explicit request indicates the slot offset K. Accordingly, in such embodiments, the CMRRI need not include the slot offset K in the definition of the CMR resources.

As shown in the example of Table 1, in some embodiments, the explicit request may indicate that a communications device is not required to transmit a CMR.

As described above, the CMRRI may define resources on a shared channel (e.g. PUSCH) or on a control channel (e.g. PUCCH) or both. Accordingly, the Resource Index may point to a set of PUCCH resources, a set of PUSCH resources or a set with a mixture of PUCCH and PUSCH resources. In the example of Table 1, the CMRRI indicates certain PUCCH resources as being associated with index 1, certain PUSCH resources associated with index 2, and certain other PUCCH resources as being associated with index 3.

In a second example, it is assumed that the communications device 270 is configured with three configured grants, providing periodic communications resources. The configured grants are each associated with an index either based on an explicit indication (e.g. indicated with the configured grant resource allocation) or implicitly (e.g. based on predetermined rules, such as based on the order in which the configured grants were configured).

TABLE 2

Example of Explicit Request contents

| Bit Pattern | Configured Grant (CG) Index |
|---|---|
| 00 | No CMR requested |
| 01 | CG#1 |
| 10 | CG#2 |
| 11 | CG#3 |

As shown in Table 2, in some embodiments, the explicit request may not comprise any slot offset value. In some embodiments, no slot index K is associated with the CMR resources, either in the CMRRI or in the explicit indication.

In some embodiments, CMR resources are identified based on a time offset $T_{CSI}$ and a time of transmission of the explicit request. For example, where the CMR resources are selected from a periodic sequence of communication resources (such as periodic PUCCH resources, or periodic PUSCH resources of a configured grant), the CMR resources may be the instance of the periodic communication resources which starts first after $T_{CSI}+T_{ER}$, where $T_{ER}$ is the time at which the explicit request is received (or, in some embodiments, decoded).

In some embodiments, when a communications device uses Configured Grant PUSCH resources to transmit a CMR, the communications device uses a configured grant resource at a time delay $T_{CSI}$ after the communications device has decoded the GC-DCI. In this embodiment, a configured grant resource is periodically allocated to the communications device and the communications device will transmit the CMR in a next periodic configured grant resource after the time delay $T_{CSI}$. The time delay $T_{CSI}$ may have been indicated to the communications device, for example, in the GC-DCI, by RRC signalling or the time delay may have been specified in a specification.

Figure 7:
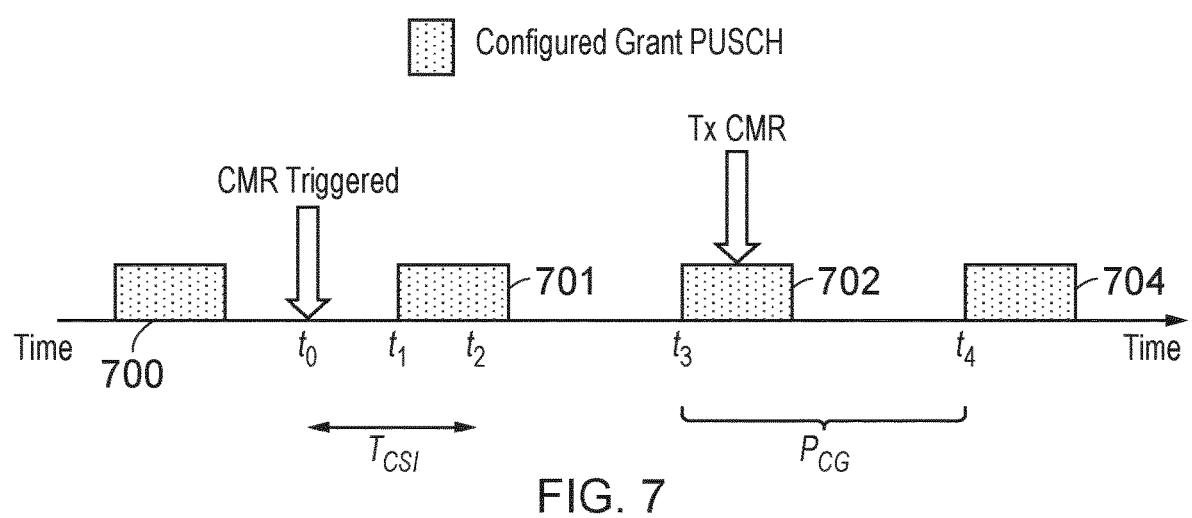
FIG. 7 illustrates a transmission of a channel measurement report CMR using periodic communications resources in accordance with embodiments of the present technique.

FIG. 7 illustrates an example where a periodic Configured Grant allocates resources 700-704 with periodicity $P_{CG}$ to a communications device. At a time $T_{ER}=t_0$, the network triggers a CMR using an explicit request, such as a GC-DCI. The next configured grant resource 701 occurring after $T_{ER}$ start at time t1. However, the communications device does not use the configured grant resources 701 which start at time $t_1$ because the time $t_1$ occurs during the time delay $T_{CSI}$, that is, t1<t0+$T_{CSI}$. Accordingly, the communications device transmits the CMR in a next periodic configured grant resource 702 after the time delay $T_{CSI}$, because the next periodic configured grant resource 702 starts at time t3, where t3>t0+$T_{CSI}$.

In some embodiments, where a communications device in a group is requested to transmit a CMR, the CMR resources for that communications device are determined based on whether or not one or more other communications devices in the group is/are requested to transmit a CMR.

In some such embodiments, the communications devices within the group are ordered, as are CMR resources for each communications device. The first (in order) communications device which is requested to transmit a CMR uses the CMR resources which are first in the order of CMR resources for that communications device; the second communications device which is requested to transmit a CMR uses the CMR resources which are second in its ordered list of CMR resources, and so on. Example embodiments can therefore indicate both whether a communications device should transmit a CMR, and which of a plurality of CMR resources it should use, using only a single bit per communications device in the explicit request. For example, the first bit in the explicit request may be a '1' if the first communications device in the group is requested to transmit a CMR and a '0' otherwise. Respective bits in the explicit request may indicate whether the corresponding communications device is requested to transmit a CMR. Preferably, the CMR resources are the same for at least two or more adjacently-ordered communications devices. More preferably, adjacently ordered CMR resources for these communications devices are contiguous FIG. 8 illustrates an example of such embodiments.

Figure 8:
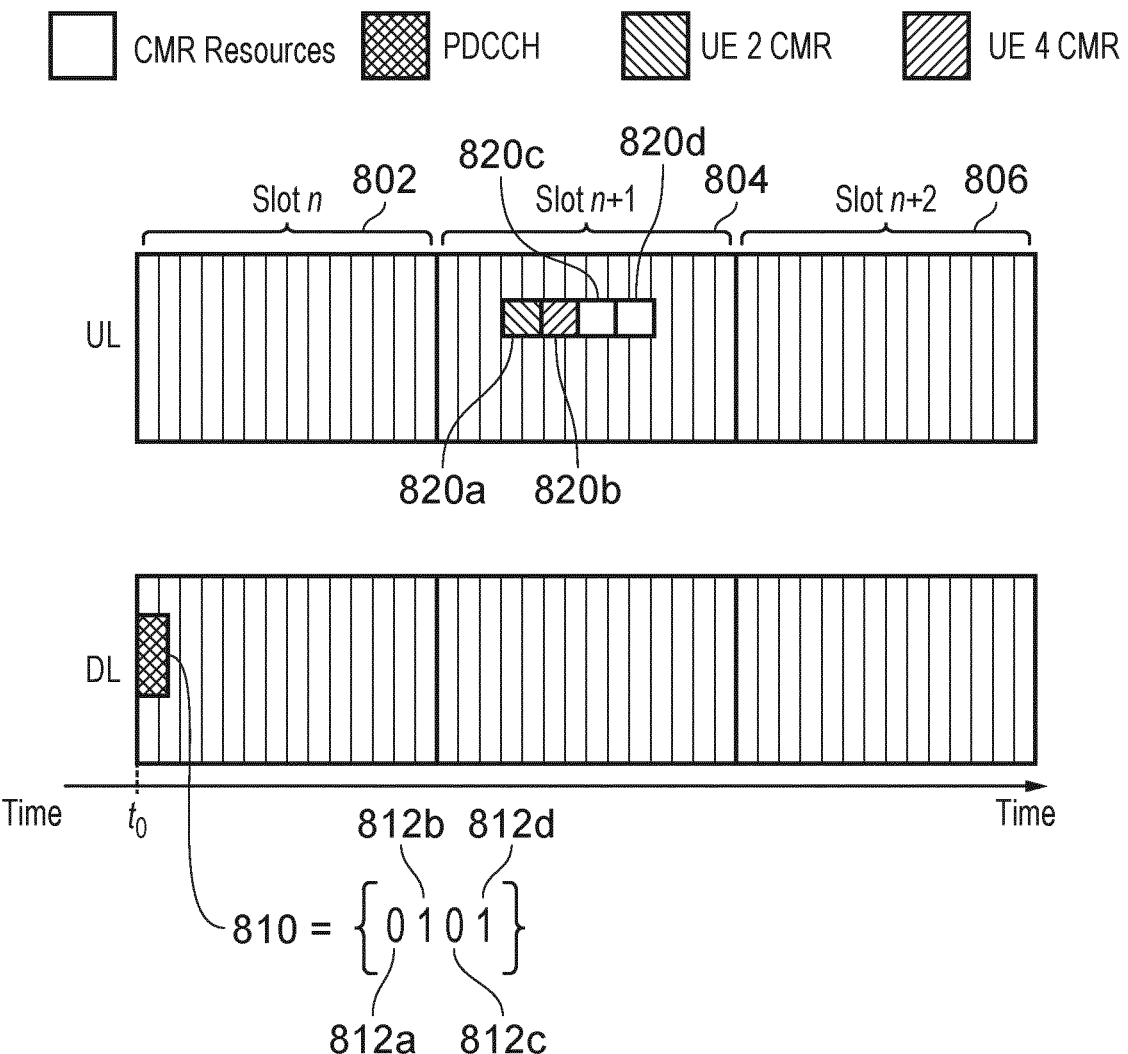
FIG. 8 illustrates an example selection of CMR resources in accordance with embodiments of the present technique.

FIG. 8 illustrates an example selection of CMR resources in accordance with embodiments of the present technique.

In the example of FIG. 8, an explicit request 810 is transmitted in a first slot 802 to a group of four communications devices. Each of the four communications devices is configured via a respective CMRRI, or otherwise, with four CMR resources which, for the explicit request 810, correspond to first to fourth CMR resources 820a-d in a second slot 804.

The explicit indication 810 comprises four bits 812a-d, each associated with a respective communications device. The first communications device determines that its associated bit 812a, set to 0, indicates that it is not requested to transmit a CMR.

The second communications device determines that its associated bit 812b, set to 1, indicates that it is requested to transmit a CMR. Furthermore, based on the value of the first bit 812a, the second communications device determines that it is the first of the communications devices to be requested to transmit a CMR. Accordingly, it selects as its CMR resources the first CMR resources 820a and transmits a CMR using those resources.

The third communications device determines that its associated bit 812c, set to 0, indicates that it is not requested to transmit a CMR.

The fourth communications device determines that its associated bit 812d, set to 1, indicates that it is requested to transmit a CMR. Furthermore, based on the value of the first to third bits 812a-c, the fourth communications device determines that it is the second of the communications devices to be requested to transmit a CMR. Accordingly, it selects as its CMR resources the second CMR resources 820b and transmits a CMR using those resources.

Embodiments of the present technique can therefore provide methods for efficiently allocating communications resources for the transmission of multiple CMRs. In particular, some embodiments can ensure that the unused communications resources may be contiguous and thus permit more flexible and efficient allocation of the unused communications resources.

In the example of FIG. 5, FIG. 6 and FIG. 8 the CMRRIs for each of the communications devices within a group may be the same, such that, for a given explicit request, each of the communications devices which are requested to transmit a channel measurement report may select from the same set of CMR resources.

However, the present disclosure is not so limited and the respective CMRRIs may indicate different resources. In particular, for example, the infrastructure equipment 272 may take into account any currently configured persistent resource allocations for a communications device, such that the CMRRI for that communications device may depend on whether there are any currently configured persistent resource allocations for that communications device.

In some embodiments, the explicit request does not include any per-communications device indication, such that the explicit request may indicate either that all communications devices in the group are requested to transmit a CMR, or that none of the communications devices in the group are requested to transmit a CMR.

The techniques disclosed herein may be applicable in embodiments where the explicit request is transmitted only to a single communications device. In such embodiments, the RRC configuration message 550, 556 may not include the group configuration indication 554.

Triggering Conditions for Transmitting a CMR

In the example techniques described herein, a communications device may respond to a request for a CMR by transmitting a CMR using the determined CMR resources.

However, in some embodiments, the CMR request in such circumstances may be transmitted only if additional conditions are satisfied.

In some embodiments, the additional conditions are satisfied only if the communications device has not sent any CMR within a time period having a predetermined duration $T_{NO-CSI}$ and ending at a time which is determined based on the explicit request. For example, in some embodiments, the time is the time at which the explicit request is received. In some embodiments, the time is the start time of the CMR resources which would be used to send the CMR if the conditions are satisfied.

An indication of the value of the duration $T_{NO-CSI}$ may be transmitted in the explicit indication (e.g. in a GC-DCI), in RRC signalling, or may be predetermined and specified for example in standards specifications.

Accordingly, embodiments of the present technique can avoid the transmission of a CMR which is transmitted close in time to another earlier CMR transmitted by the same communications device. This can reduce power consumption of the communications device, and can reduce interference on the wireless access interface. The reduction of interference may be particularly beneficial when the CMR resources that would otherwise be used by the communications device may be selected as CMR resources for the transmission of CMRs by other communications devices.

In some embodiments, the conditions are satisfied only if the report that would be transmitted in response to the explicit request differs by more than a predetermined amount from a most recently transmitted earlier CMR.

For example, where the CMR includes a CQI index, the conditions may be satisfied only if the CQI index to be reported in the CMR differs by more than $\Delta CQI$ from a CQI index sent in the most recent CMR previously transmitted by the communications device. For example, the value of $\Delta CQI$ may be 2. Where a CMR is transmitted reporting a CQI value of 5, the communications device may subsequently receive an explicit request, requesting it to transmit a further CMR. In response to receiving the request, the communications device determines a new CQI value to be reported. If the new CQI value is within the range 3-7 inclusive (i.e. 5+/−2, inclusive), then no CMR is transmitted in response to the CMR request.

On the other hand, if the new CMR is determined to be, for example, 9, then a CMR is transmitted in response to the CMR request, indicating the CQI value of 9, because 9 differs from 5 by more than 2 ($\Delta CQI$).

An indication of the value of $\Delta CQI$ may be transmitted in the explicit request (e.g. in the GC-DCI) or in RRC signalling, and/or may be specified in the standards specifications.

In some embodiments, the conditions which must be satisfied may be indicated within the explicit request by means of a condition indication. The conditions may be indicated separately for each communications device in the group, i.e. there may be one condition indication per communications device in the group. In other examples, a common condition indication applies to multiple (and in some examples, all) communications devices in the group.

The condition indication may indicate one or more of:
that no aperiodic CMR is requested;
that an aperiodic CMR is to be transmitted unconditionally;
that an aperiodic CMR is to be transmitted if one or more conditions are satisfied, the one or more conditions selected from:
a condition that the communications device has not sent any CMR within a time period having the predetermined duration and ending at a time when the CMR would be sent if the conditions were satisfied, and
a condition that the report that would be transmitted differs by more than a predetermined amount from a most recently transmitted earlier CMR by the communications device.

In response to receiving the explicit request comprising a condition indication which applies to it, the communications device evaluates any conditions which must be evaluated in order to determine whether a CMR is to be transmitted, and either transmits the CMR (if the CMR is requested unconditionally, or the applicable conditions are satisfied) or refrains from transmitting the CMR (if no CMR is requested, or the applicable conditions are not satisfied).

An example of a 2-bit condition indicator is shown in Table 3 below:

TABLE 3

Example of condition indication

| Bit pattern | Action |
| --- | --- |
| 00 | Do not send CMR |
| 01 | Send CMR if current CQI and previous reported CQI difference is beyond $\Delta CQI$ |
| 10 | Send CMR if no CQI is reported in the past $T_{NO-CSI}$ ms |
| 11 | Send CMR straight away |

In some embodiments, the selection of CMR resources for the transmission of the CMR may be in accordance with any of the techniques disclosed herein.

Figure 9:
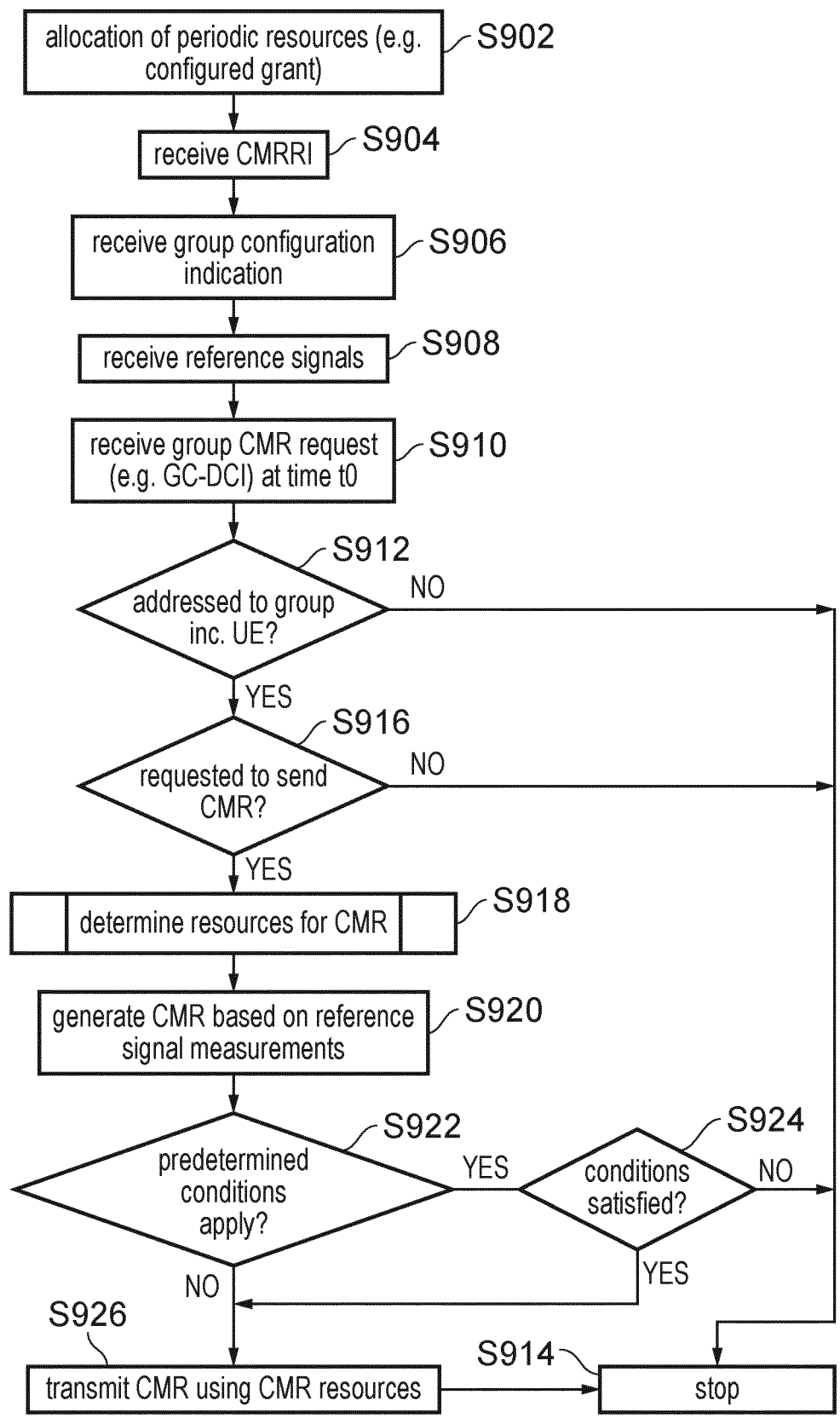
FIG. 9 is a process flow chart illustrating a process which may be carried out by a communications device for transmitting a channel measurement report in accordance with embodiments of the present technique.

FIG. 9 is a process flow chart illustrating a process which may be carried out by the communications device 270 in accordance with embodiments of the present technique.

The process of FIG. 9 starts at step S902 in which the communications device 270 is allocated periodic uplink communication resources, such as by means of a configured grant. The allocation may be by means of an RRC reconfiguration message transmitted by the infrastructure equipment 272.

At step S904, the communications device 270 receives a CMR resource indication (CMRRI), transmitted by the infrastructure equipment 272, which indicates how the communications device 270 is to determine CMR resources for transmitting a CMR in the event that the communications device 270 receives a request to transmit a CMR. For example, as described above, the CMRRI may comprise an indication of one or more relative resource indications, for determining the CMR communications resources based on a time at which the request to transmit the CMR is received.

The CMRRI may also comprise an indication of predetermined conditions which are to be applied in the event of the communications device 270 receiving a request to transmit the CMR. In some embodiments, the indication of the predetermined conditions may be transmitted separately from the CMRRI.

At step S906, the communications device 270 receives a group configuration indication. The group configuration indication indicates that the communications device 270 is part of a group of communications devices which can be requested to transmit a CMR by means of a single group CMR request. The group configuration indication may comprise an indication of parameters associated with the group, such as a position of the communications device 270 within an ordered list of the communications devices within the group, and/or an identity associated with the group used to transmit the group CMR request.

At step S908, the communications device 270 receives reference signals, transmitted by the infrastructure equipment. The reference signals may be transmitted in accordance with conventional techniques, and may use predetermined communication resources. Step S908 may thus occur periodically throughout the process. The communications device may perform measurements of the reference signals in order to determine one or more parameters associated with the wireless channel applicable to transmissions by the infrastructure equipment which are received by the communications device. In some embodiments, the communications device 270 performs these measurements in respect of all received reference signals. In some other embodiments, the communications device may perform measurements only in response to (i.e. after) receiving a request for transmitting a CMR.

At step S910, the communications device 270 receives a group CMR request, such as within a GC-DCI. The group CMR request is received at time to, which may be within a slot N of the wireless access interface.

At step S912, the communications device 270 determines whether the group CMR request is addressed to the group which includes the communications device 270. For example, the communications device 270 may determine that the group CMR request is not addressed to the group because the request does not comprise (e.g. was not transmitted using) the identity of the group indicated at step S906.

If the communications device determines that the group CMR request is not addressed to the group, then the process continues with step S914 and the process ends.

If the group CMR request is addressed to the group which includes the communications device 270 (e.g. it comprises the identity of the group indicated at step S906), then control passes to step S916 at which the communications device 270 determines whether the group CMR request comprises a request for the communications device 270 to transmit a CMR.

As described above, the group CMR request may indicate for each communications device in the group, whether that communications device is requested to transmit a CMR.

In some embodiments, the group CMR request comprises a plurality of index values, each index value indicating to a respective one of the communications devices whether that communications device is requested to transmit a CMR. In some embodiments, the index value also indicates which of a plurality of CMR resources are to be selected by the communications device if it is requested to transmit a CMR. In some embodiments, the index value also indicates that the communications device is requested to transmit a CMR only if one or more predetermined conditions are to be satisfied. In some such embodiments, group CMR request may comprise an indication of which, if any, predetermined condition(s) is/are to be satisfied.

Accordingly, it will be appreciated that in some embodiments, not all of the following steps are carried out, depending on the nature of the group CMR request.

At step S916, if the communications device 270 determines that it is not requested to transmit a CMR, then control passes to step S914 and the process ends. Otherwise, the process continues to step S918.

At step S918 the communications device 270 determines communication resources for transmitting the CMR. This may be in accordance with the process illustrated in FIG. 10 and described below.

At step S920, the communications device 270 generates the CMR based on one or more measurements of reference signals received at step S908. The CMR may be a channel state information (CSI) report. As described above, the CMR may comprise, for example, a CQI indication. The CMR may be generated and encoded for transmission in accordance with a type of channel on which the CMR is to be sent. For example, based on whether the CMR resources are on a control channel or on a shared channel.

At step S922, the communications device 270 determines whether predetermined conditions apply to the sending of the CMR. As described above, the applicable predetermined conditions may be indicated in the group CMR request. Alternatively or additionally, they may be configured by means of RRC configuration, by specification in an appropriate standards document, or by any other known suitable means.

If at step S922 it is determined that predetermined conditions apply, then control passes to step S924. At step S924, the applicable predetermined conditions are evaluated. This may be based on a time of a most recently transmitted CMR and a time of receiving the group CMR request at step S910. Additionally or alternatively, this may be based on the contents of the generated CMR and the contents of a most recently transmitted CMR.

Where the evaluation of the predetermined conditions does not depend on the resources selected to send the CMR in response to the group CMR request, step S922 may occur before step S918. Where the predetermined conditions do not depend on the contents of the CMR, step S922 may occur before step S920.

If the predetermined conditions are satisfied, then control passes to step S926 and the communications device 270 transmits the CMR generated at step S920 using the CMR resources determined at step S918. The communications device 270 may additionally store the time of the transmission of the CMR and/or some or all of the contents of the CMR for enabling future evaluation of predetermined conditions for transmission of a subsequent CMR. After step S926 control passes to step S914 and the process ends.

If the predetermined conditions are not satisfied, then control passes to step S914 and the process ends.

It will be appreciated that in some embodiments, one or more of the above steps may be re-ordered, modified or omitted. For example, in some embodiments, predetermined conditions do not apply to the transmission of the CMR, and control may pass directly from step S920 to step S926. Similarly, for example, in some embodiments, the steps S902, S904, S906 and S908 may occur in an order different to that shown in FIG. 9. In some embodiments, step S908 may occur only in response to step S910 or in response to one or more other determinations (e.g. at step S916).

Figure 10:
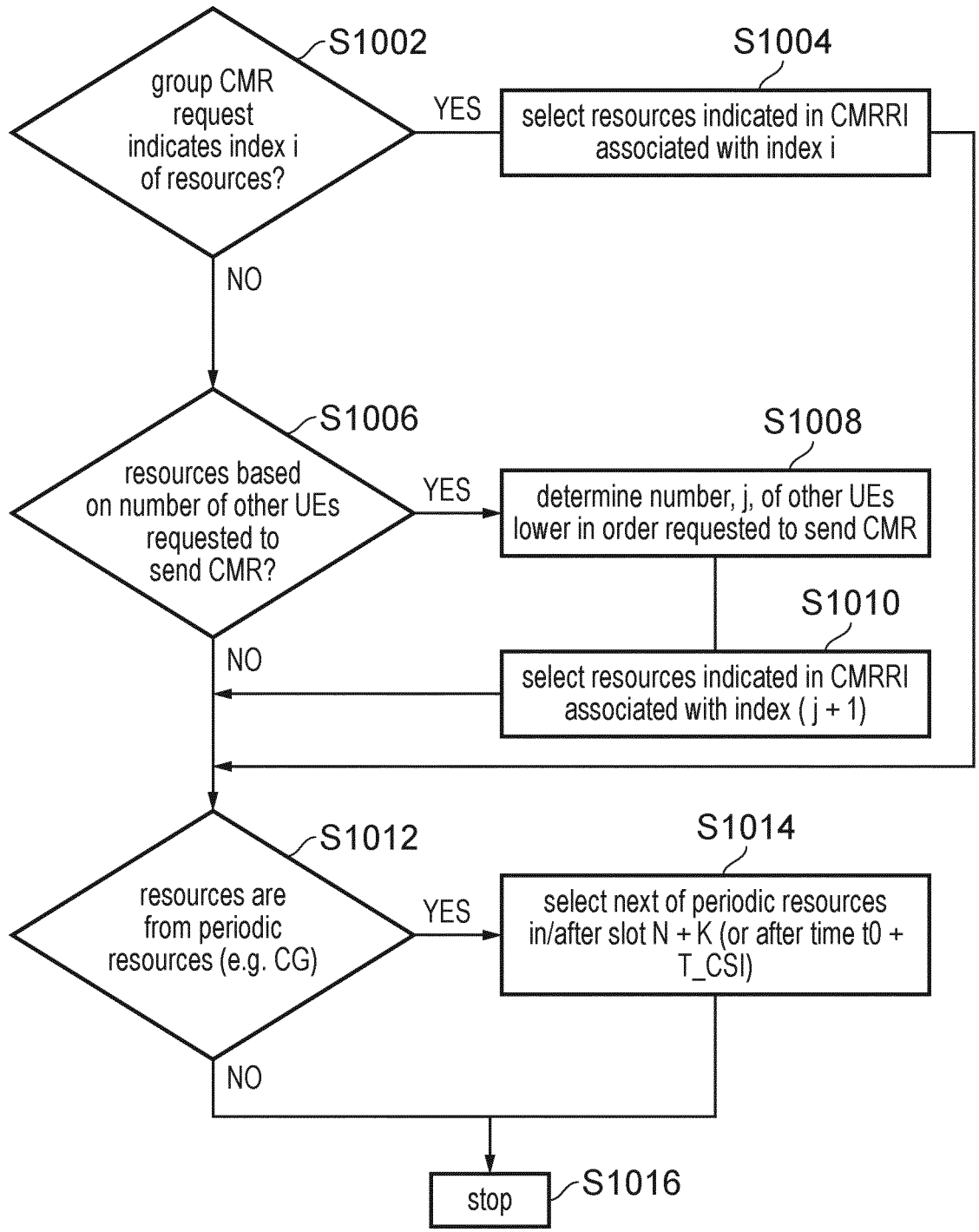
FIG. 10 illustrates a process carried out by a communications device for selecting communication resources for transmitting a channel measurement report in accordance with embodiments of the present technique.

FIG. 10 illustrates a process carried out by a communications device for selecting communication resources (CMR resources) for transmitting a channel measurement report in accordance with embodiments of the present technique.

The process starts at step S1002, in which the communications device 270 determines whether the group CMR request indicates an index i which refers to one of a plurality of CMR resources indicated by a CMRRI, such as the CMRRI received in step S904 of the process of FIG. 9.

If it does, the control passes to step S1004, and the communications device selects the resources indicated by the CMRRI as associated with the index i. Control then passes to step S1012.

If at step S1002, the communications device 270 determines that the group CMR request does not indicate such an index i, the control passes to step S1006.

At step S1006, the communications device 270 determines whether the determination of the CMR resources is based on a number of other communications devices (UEs) which are also requested to transmit a CMR, for example, a number of other communications devices which are lower in an order of communications devices within the group which are also requested to transmit a CMR. If so, then control passes to step S1008.

At step S1008, the communications device determines the number, j, of other communications devices, such as the number of other communications devices which are lower in the order of communications devices within the group which are also requested to transmit a CMR. Control then passes to step S1010.

At step S1010, the communications device 270 determines, as the CMR resources, the communication resources associated with the index (j+1) indicated by the CMRRI.

Control then passes to step S1012.

At step S1012, the communications device 270 determines whether the resources determined at step S1004 or step S1010, as the case may be, are periodic communication resources, such as those corresponding to a periodic PUCCH allocation (e.g. for periodic CSI) or to PUSCH resources allocated by a configured grant. If they are not, the control passes to step S1016 and the process ends.

If the resources determined at step S1004 or step S1010 are periodic communication resources, then control passes to step S1014. At step S1014, the communications device 270 selects, as the CMR resources, an instance of the periodic resources. The instance may be the next occurring instance, the next occurring instance during or after slot N+K (where K is a slot offset associated with the CMR resources), or the next occurring instance after time $t0+T_{CSI}$.

After step S1014, control passes to step S1016 and the process ends.

The determinations at step S1002 and/or S1006 may be based on an indication transmitted by the infrastructure equipment 272 to the communications device 270. The indication may be for example, included in a CMRRI such as that received at step S904 of the process of FIG. 9, or may be included in a group configuration indication such as that received at step S906 of the process of FIG. 9.

In some embodiments of the present technique, it will be appreciated that one or more steps of the process of FIG. 10 may be omitted, modified or re-ordered.

For example, in some embodiments, the process includes only step S1004. In some embodiments, the process includes only steps S1008 and S1010. In some embodiments, the process starts at step S1004 and omits steps S1002, S1006, S1008 and S1010. In some embodiments, the process starts at step S1008 and omits steps S1002, S1004, and S1006. In some embodiments, steps S1012 and S1014 are omitted.

In the process shown in FIG. 10, it is assumed that the CMRRI indicates resources associated with index values starting at 1. However, it will be appreciated that this is for convenience and clarity and that the index values may start at any appropriate value (such as 0) in which case the corresponding modifications are made to the process of FIG. 10.

Accordingly, embodiments of the present technique can provide method of operating a communications device, the method comprising: receiving reference signals transmitted by the infrastructure equipment on a wireless access interface, receiving downlink control information (DCI) transmitted by the infrastructure equipment to the communications device and each of one or more other communications devices which together form a group of communications devices, the DCI indicating whether each of the respective communications devices of the group is to transmit a channel measurement report, and in response to receiving the DCI, determining, based on the DCI, communications resources for transmitting the channel measurement report, generating a channel measurement report (CMR) based on the received reference signals, and transmitting the channel measurement report using the determined communications resources.

There has also been described a method of operating an infrastructure equipment forming part of a wireless communications network, the method comprising transmitting reference signals via the wireless access interface, transmitting downlink control information (DCI) via the wireless access interface to one or more communications devices which form a group of communications devices, the DCI indicating whether each of the respective communications devices of the group is to transmit a channel measurement report (CMR), and receiving, in response to the transmitted DCI, a channel measurement report from the one or more of the communications devices of the group, the channel measurement reports being received from communications resources of the wireless access interface determined from the transmitted DCI.

Corresponding communications devices, infrastructure equipment and circuitry for a communications device and circuitry for infrastructure equipment have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to URLLC/IIoT devices or other low latency communications devices, but can be applied more generally, for example in respect of any type of communications device operating with a wireless link to the communication network.

It will further be appreciated that the principles described herein are applicable not only to LTE-based or 5G/NR-based wireless telecommunications systems, but are applicable for any type of wireless telecommunications system that supports channel measurement reporting.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a communications device, the method comprising: receiving reference signals transmitted by the infrastructure equipment on a wireless access interface, receiving downlink control information (DCI) transmitted by the infrastructure equipment to the communications device and each of one or more other communications devices which together form a group of communications devices, the DCI indicating whether each of the respective communications devices of the group is to transmit a channel measurement report, and in response to receiving the DCI, determining, based on the DCI, communications resources for transmitting the channel measurement report, generating a channel measurement report (CMR) based on the received reference signals, and transmitting the channel measurement report using the determined communications resources.

Paragraph 2. A method according to paragraph 1, wherein the channel measurement report comprises a channel quality index corresponding to one of a predetermined plurality of modulation and coding schemes (MCS), the correspondence of the channel quality index and the predetermined plurality of MCS being determined according to a predetermined mapping.

Paragraph 3. A method according to paragraph 2, wherein the generating the channel measurement report comprises selecting, based on the measurements of the received reference signals, a modulation and coding scheme (MCS) from a plurality of predetermined MCSs, the selected MCS being a most efficient MCS of a subset of the predetermined MCSs, wherein, if used by a transmitter of the infrastructure equipment to encode a block of data, each of the subset of the predetermined MCSs would result in a probability that the block of data is not received and decoded successfully by a receiver of the communications device being not more than a predetermined probability, and generating the channel measurement report to include the channel quality index corresponding to the selected MCS.

Paragraph 4. A method according to any of paragraphs 1 to 3, the method comprising: receiving a channel measurement report resource indication (CMRRI), the CMRRI for determining communication resources for the transmission of the channel measurement report based on the received DCI, wherein the determining, based on the DCI, the communications resources for transmitting the channel measurement report comprises determining the communications resources for transmitting the channel measurement report based on the CMRRI and the received DCI.

Paragraph 5. A method according to paragraph 4, wherein the CMRRI comprises one or more relative resource indications, each of the relative resource indications for determining the communications resources for transmitting the channel measurement report based on the DCI and based on a time when the DCI is transmitted, the DCI comprises an indication of one of the one or more relative resource indications, and the determining, based on the DCI, the communications resources for transmitting the channel measurement report comprises determining the time when the DCI was transmitted and is based on the relative resource indication indicated by the DCI.

Paragraph 6. A method according to paragraph 5, wherein each of the relative resource indications comprises an indication of a range of frequencies.

Paragraph 7. A method according to any of paragraphs 4 to 6 wherein the wireless access interface provides resources divided in time into time slots, the DCI is received in a first time slot, one of the CMRRI and the DCI comprises a slot offset indication, and determining the communications resources for transmitting the channel measurement report based on the CMRRI and the DCI comprises determining a time slot based on the slot offset indication and the first time slot.

Paragraph 8. A method according to any of paragraphs 1 to 7, the method comprising receiving a configured grant, the configured grant allocating a plurality of periodic communication resources, wherein the communications resources for transmitting the channel measurement report are selected from the plurality of periodic communication resources.

Paragraph 9. A method according to paragraph 8, wherein the communications resources selected for transmitting the channel measurement report comprise the first of the plurality of periodic communication resources which occur after a predetermined duration after the receiving the DCI.

Paragraph 10. A method according to any of paragraphs 1 to 9, wherein the communications resources selected for transmitting the channel measurement report comprise resources of a physical uplink shared channel.

Paragraph 11. A method according to any of paragraphs 1 to 10, wherein the communications resources selected for transmitting the channel measurement report comprise resources of a physical uplink control channel.

Paragraph 12. A method according to any of paragraphs 4 to 11, wherein the DCI transmitted by the infrastructure equipment to the group of communications device of which the communications device forms part is a group common downlink control information (GC-DCI) comprising a plurality of indication fields, each of the plurality of indication fields indicating whether a corresponding one the communications device and the other communications devices of the group is requested to transmit a channel measurement report.

Paragraph 13. A method of paragraph 12, wherein the determining, based on the DCI, the communications resources for transmitting the channel measurement report, includes determining the communications resources based on whether each of the one or more other communications devices of the group is also requested to transmit a channel measurement report.

Paragraph 14. A method according to paragraphs 12 or paragraph 13, wherein the CMRRI identifies a plurality of sets of physical resources of an uplink channel, each set being configured for one of the communications devices of the group to transmit a channel measurement report, and the determining, based on the DCI, the communications resources for transmitting the channel measurement report includes selecting one of the sets of the resource of the uplink channel based on whether the one or more other communications devices of the group is also requested to transmit a channel measurement report.

Paragraph 15. A method according to paragraph 14, wherein indication fields are ordered, the indication field associated with the communications device is at a first position in the order, and the determining, based on the DCI, the communications resources for transmitting the channel measurement report includes determining a number of indication fields which are at a lower position in the order than the first position and which indicate that another communications device is requested to transmit a channel measurement report.

Paragraph 16. A method according to paragraph 15, wherein each of the plurality of sets of physical resources is associated with a value, and the determining, based on the DCI, the communications resources for transmitting the channel measurement report is based on the one of the plurality of sets of physical resources associated with the value equal to the number of indication fields which are at a lower position in the order than the first position and which indicate that another communications device is requested to transmit a channel measurement report.

Paragraph 17. A method according to any of paragraphs 1 to 16, the method comprising determining whether to transmit the channel measurement report or not to transmit the channel measurement report according to predetermined conditions.

Paragraph 18. A method according to paragraph 17, wherein the DCI comprises an indication of the predetermined conditions.

Paragraph 19. A method according to paragraph 17 or paragraph 18, wherein, according to the predetermined conditions, the channel measurement report is transmitted if the communications device has not sent any CMR within a time period having a predetermined duration and ending at the start of the determined communications resources.

Paragraph 20. A method according to any of paragraphs 17 to 19, wherein, according to the predetermined conditions, the channel measurement report is transmitted if a measurement indication in the channel measurement report differs by more than a predetermined amount from a corresponding measurement indication in a most recent earlier CMR transmitted by the communications device.

Paragraph 21. A method according to paragraph 20, wherein the measurement indication indicates a channel quality indicator (CQI) value.

Paragraph 22. A communications device for operating in cooperation with a wireless communications network, the communications device comprising receiver circuitry configured to receive signals transmitted via a wireless access interface from the wireless communications network, and transmitter circuitry configured to transmit signals via the wireless access interface of the wireless communications network, and controller circuitry configured to control the receiver circuitry and the transmitter circuitry to receive reference signals transmitted from the wireless communications network via the wireless access interface, to receive downlink control information (DCI) transmitted via the wireless access interface by the wireless communications network to the communications device and each of one or more other communications devices which together form a group of communications devices, the DCI indicating whether each of the respective communications devices of the group is to transmit a channel measurement report (CMR), and in response to receiving the DCI, to determine, based on the DCI, communications resources for transmitting the channel measurement report, to generate the channel measurement report based on the received reference signals, and to transmit the channel measurement report using the determined communications resources.

Paragraph 23. A communications device according to paragraph 22, wherein the channel measurement report comprises a channel quality index corresponding to one of a predetermined plurality of modulation and coding schemes (MCS), the correspondence of the channel quality index and the predetermined plurality of MCS being determined according to a predetermined mapping.

Paragraph 24. A communications device according to paragraph 22, wherein the controller circuitry is configured to generate the channel measurement report by selecting, based on the measurements of the received reference signals, a modulation and coding scheme (MCS) from a plurality of predetermined MCSs, the selected MCS being a most efficient MCS of a subset of the predetermined MCSs, wherein, if used by a transmitter of the infrastructure equipment to encode a block of data, each of the subset of the predetermined MCSs would result in a probability that the block of data is not received and decoded successfully by the receiver circuitry being not more than a predetermined probability, and generating the channel measurement report to include the channel quality index corresponding to the selected MCS.

Paragraph 25. A communications device according to any of paragraphs 22 to 24, wherein the controller circuitry is configured with the receiver circuitry to receive a channel measurement report resource indication (CMRRI), and the controller circuitry is configured to determine the communications resources for transmitting the channel measurement report based on the CMRRI and the received DCI.

Paragraph 26. A communications device according to paragraph 25, wherein the CMRRI comprises one or more relative resource indications, each of the relative resource indications for determining the communications resources for transmitting the channel measurement report based on the DCI and based on a time when the DCI is transmitted, and the DCI comprises an indication of one of the one or more relative resource indications, and the controller circuitry is configured to determine, the communications resources for transmitting the channel measurement report from the time when the DCI was transmitted and the relative resource indication indicated by the CMRRI.

Paragraph 27. A communications device according to paragraph 26, wherein each of the relative resource indications comprises an indication of a range of frequencies.

Paragraph 28. A communications device according to any of paragraphs 25 to 27 wherein the wireless access interface provides resources divided in time into time slots, and the controller circuitry is configured with the receiver circuitry to receive the DCI in a first time slot, and one of the CMRRI and the DCI comprises a slot offset indication, and to determine the communications resources for transmitting the channel measurement report based on the CMRRI and the DCI by determining a time slot based on the slot offset indication and the first time slot.

Paragraph 29. A communications device according to any of paragraphs 22 to 28, wherein the controller circuitry is configured with the receiver circuitry to receive a configured grant, the configured grant allocating a plurality of periodic communication resources, and to select the communications resources for transmitting the channel measurement report from the plurality of periodic communication resources.

Paragraph 30. A communications device according to paragraph 29, wherein the controller circuitry is configured with the receiver circuitry to select a first of the plurality of periodic communication resources which occur after a predetermined duration from the receiving the DCI.

Paragraph 31. A communications device according to any of paragraphs 22 to 30, wherein the controller circuitry is configured to select the communications resource for transmitting the channel measurement report from communications resources of a physical uplink shared channel.

Paragraph 32. A communications device according to any of paragraphs 22 to 31, wherein the controller circuitry is configured to select the communications resource for transmitting the channel measurement report from communications resources of a physical uplink control channel.

Paragraph 33. A communications device according to any of paragraphs 25 to 32, wherein the DCI transmitted by the infrastructure equipment to the group of communications device of which the communications device forms part is a group common downlink control information (GC-DCI) comprising a plurality of indication fields, each of the plurality of indication fields indicating whether a corresponding one the communications device and the other communications devices of the group is requested to transmit a channel measurement report.

Paragraph 34. A communications device of paragraph 33, wherein the controller circuitry is configured to determine, based on the DCI, the communications resources for transmitting the channel measurement report based on whether each of the one or more other communications devices of the group is also requested to transmit a channel measurement report.

Paragraph 35. A communications device according to paragraphs 33 or paragraph 34, wherein the CMRRI identifies a plurality of sets of physical resources of an uplink channel, each set being configured for one of the communications devices of the group to transmit a channel measurement report, and the controller circuitry is configured to determine the communications resources for transmitting the channel measurement report based on the DCI by selecting one of the sets of the resource of the uplink channel based on whether the one or more other communications devices of the group is also requested to transmit a channel measurement report.

Paragraph 36. A communications device according to paragraph 35, wherein indication fields are ordered, the indication field associated with the communications device is at a first position in the order, and the controller circuitry is configured to determine the communications resources for transmitting the channel measurement report based on the DCI by determining a number of indication fields which are at a lower position in the order than the first position and which indicate that another communications device is requested to transmit a channel measurement report.

Paragraph 37. A communications device according to paragraph 36, wherein each of the plurality of sets of physical resources is associated with a value, and the controller circuitry is configured to determine the communications resources for transmitting the channel measurement report based on the DCI from the one of the plurality of sets of physical resources associated with the value equal to the number of indication fields which are at a lower position in the order than the first position and which indicate that another communications device is requested to transmit a channel measurement report.

Paragraph 38. A communications device according to any of paragraphs 22 to 37, wherein the controller circuitry is configured to determine whether to transmit the channel measurement report or not to transmit the channel measurement report according to predetermined conditions.

Paragraph 39. A communications device according to paragraph 38, wherein the DCI comprises an indication of the predetermined conditions.

Paragraph 40. A communications device according to paragraph 38 or paragraph 39, wherein, according to the predetermined conditions, the channel measurement report is transmitted if the communications device has not sent any CMR within a time period having a predetermined duration and ending at the start of the determined communications resources.

Paragraph 41. A communications device according to any of paragraphs 38 to 40, wherein, according to the predetermined conditions, the channel measurement report is transmitted if a measurement indication in the channel measurement report differs by more than a predetermined amount from a corresponding measurement indication in a most recent earlier CMR transmitted by the communications device.

Paragraph 42. A communications device according to paragraph 41, wherein the measurement indication indicates a channel quality indicator (CQI) value.

Paragraph 43. A method of operating an infrastructure equipment forming part of a wireless communications network, the method comprising transmitting reference signals via the wireless access interface, transmitting downlink control information (DCI) via the wireless access interface to one or more communications devices which form a group of communications devices, the DCI indicating whether each of the respective communications devices of the group is to transmit a channel measurement report (CMR), and receiving, in response to the transmitted DCI, a channel measurement report from the one or more of the communications devices of the group, the channel measurement reports being received from communications resources of the wireless access interface determined from the transmitted DCI.

Paragraph 44. An infrastructure equipment for forming part of a wireless communications network, the infrastructure equipment comprising receiver circuitry configured to receive signals transmitted via a wireless access interface formed by the wireless communications network from one or more communications devices, transmitter circuitry configured to transmit signals via the wireless access interface to the one or more communications devices, and controller circuitry configured to control the transmitter circuitry to transmit reference signals via the wireless access interface, to transmit downlink control information (DCI) via the wireless access interface to one or more communications devices which form a group of communications devices, the DCI indicating whether each of the respective communications devices of the group is to transmit a channel measurement report (CMR), and the controller circuitry is configured to control the receiver circuitry to receive, in response to the transmitted DCI, a channel measurement report from the one or more of the communications devices of the group, the channel measurement reports being received from communications resources of the wireless access interface determined from the transmitted DCI.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," 3GPP RAN #81.
[2] Holma H. and Toskala A, "LTE for UMTS OFDMA and SC-FDMA based radio access", John Wiley and Sons, 2009.
[3] 3GPP TR 38.913 "Study on scenarios and requirements for next generation access technologies"
[4] 3GPP document RP-190726, "Physical layer enhancements for NR ultra-reliable and low latency communication (URLLC)," Huawei, HiSilicon, RAN #83
[5] 3GPP document RP-193233, "Enhanced Industrial Internet of Things (IoT) and URLLC support," Nokia, Nokia Shanghai Bell, RAN #86
[6] 3GPP document R1-1808705, "Views on evaluation methodology and Layer 1 enhancements for Rel-16 eURLLC," Intel, RAN1 #94
[7] 3GPP document R1-1900044, "UCI enhancements for URLLC", Huawei, HiSilicon, RAN1 Ad-Hoc 1901

What is claimed is:

1. A method of operating a communications device, comprising:
   receiving reference signals transmitted by an infrastructure equipment on a wireless access interface,
   receiving downlink control information (DCI) transmitted by the infrastructure equipment to the communications device and each of one or more other communications devices which together form a group of communications devices, the DCI indicating whether each of the respective communications devices of the group is to transmit a channel measurement report, and
   in response to receiving the DCI,
   determining, based on the DCI, communications resources for transmitting the channel measurement report,
   generating a channel measurement report (CMR) based on the received reference signals, and
   transmitting the channel measurement report using the determined communications resources,
   wherein the DCI transmitted by the infrastructure equipment to the group of communications devices of which the communications device forms part is a group common downlink control information (GC-DCI) comprising a plurality of indication fields, each of the plurality of indication fields indicating whether a corresponding one the communications device and the other communications devices of the group is requested to transmit a channel measurement report.

2. The method according to claim 1, wherein the channel measurement report comprises a channel quality index corresponding to one of a predetermined plurality of modulation and coding schemes (MCS), the correspondence of the channel quality index and the predetermined plurality of MCS being determined according to a predetermined mapping.

3. The method according to claim 2, wherein the generating the channel measurement report comprises:
   selecting, based on the measurements of the received reference signals, a modulation and coding scheme (MCS) from a plurality of predetermined MCSs, the selected MCS being a most efficient MCS of a subset of the predetermined MCSs, wherein, in response to determining that use by a transmitter of the infrastructure equipment to encode a block of data, each of the subset of the predetermined MCSs would result in a probability that the block of data is not received and decoded successfully by a receiver of the communications device being not more than a predetermined probability, and
   generating the channel measurement report to include the channel quality index corresponding to the selected MCS.

4. The method according to claim 1, comprising:
   receiving a channel measurement report resource indication (CMRRI), the CMRRI for determining communication resources for the transmission of the channel measurement report based on the received DCI, wherein the determining, based on the DCI, the communications resources for transmitting the channel measurement report comprises determining the communications resources for transmitting the channel measurement report based on the CMRRI and the received DCI.

5. The method according to claim 4, wherein the CMRRI comprises one or more relative resource indications, each of the relative resource indications for determining the communications resources for transmitting the channel measurement report based on the DCI and based on a time when the DCI is transmitted,
   the DCI comprises an indication of one of the one or more relative resource indications, and
   the determining, based on the DCI, the communications resources for transmitting the channel measurement report comprises determining the time when the DCI was transmitted and is based on the relative resource indication indicated by the DCI.

6. The method according to claim 5, wherein each of the relative resource indications comprises an indication of a range of frequencies.

7. The method according to claim 4 wherein
the wireless access interface provides resources divided in time into time slots, the DCI is received in a first time slot, one of the CMRRI and the DCI comprises a slot offset indication, and
determining the communications resources for transmitting the channel measurement report based on the CMRRI and the DCI comprises determining a time slot based on the slot offset indication and the first time slot.

8. The method according to claim 1, the method comprising:
receiving a configured grant, the configured grant allocating a plurality of periodic communication resources, wherein
the communications resources for transmitting the channel measurement report are selected from the plurality of periodic communication resources.

9. The method according to claim 8, wherein the communications resources selected for transmitting the channel measurement report comprise the first of the plurality of periodic communication resources which occur after a predetermined duration after the receiving the DCI.

10. The method according to claim 1, wherein the communications resources selected for transmitting the channel measurement report comprise resources of a physical uplink shared channel.

11. The method according to claim 1, wherein the communications resources selected for transmitting the channel measurement report comprise resources of a physical uplink control channel.

12. The method of claim 1, wherein the determining, based on the DCI, the communications resources for transmitting the channel measurement report, includes
determining the communications resources based on whether each of the one or more other communications devices of the group is also requested to transmit a channel measurement report.

13. The method according to claim 4, wherein the CMRRI identifies a plurality of sets of physical resources of an uplink channel, each set being configured for one of the communications devices of the group to transmit a channel measurement report, and the determining, based on the DCI, the communications resources for transmitting the channel measurement report includes
selecting one of the sets of the resource of the uplink channel based on whether the one or more other communications devices of the group is also requested to transmit a channel measurement report.

14. The method according to claim 13, wherein indication fields are ordered, the indication field associated with the communications device is at a first position in the order, and the determining, based on the DCI, the communications resources for transmitting the channel measurement report includes
determining a number of indication fields which are at a lower position in the order than the first position and which indicate that another communications device is requested to transmit a channel measurement report.

15. The method according to claim 14, wherein each of the plurality of sets of physical resources is associated with a value, and
the determining, based on the DCI, the communications resources for transmitting the channel measurement report is based on the one of the plurality of sets of physical resources associated with the value equal to the number of indication fields which are at a lower position in the order than the first position and which indicate that another communications device is requested to transmit a channel measurement report.

16. The method according to claim 1, comprising:
determining whether to transmit the channel measurement report or not to transmit the channel measurement report according to predetermined conditions.

17. The method according to claim 16, wherein the DCI comprises an indication of the predetermined conditions.

18. A method of operating an infrastructure equipment forming part of a wireless communications network, comprising:
transmitting reference signals via the wireless access interface,
transmitting downlink control information (DCI) via the wireless access interface to one or more communications devices which form a group of communications devices, the DCI indicating whether each of the respective communications devices of the group is to transmit a channel measurement report (CMR), and
receiving, in response to the transmitted DCI, a channel measurement report from the one or more of the communications devices of the group, the channel measurement reports being received from communications resources of the wireless access interface determined from the transmitted DCI,
wherein the DCI transmitted by the infrastructure equipment to the group of communications devices is a group common downlink control information (GC-DCI) comprising a plurality of indication fields, each of the plurality of indication fields indicating whether a corresponding one the communications devices in the group of communication devices is requested to transmit a channel measurement report.

19. An infrastructure equipment for forming part of a wireless communications network, comprising:
receiver circuitry configured to receive signals transmitted via a wireless access interface formed by the wireless communications network from one or more communications devices,
transmitter circuitry configured to transmit signals via the wireless access interface to the one or more communications devices, and
controller circuitry configured to control the transmitter circuitry
to transmit reference signals via the wireless access interface,
to transmit downlink control information (DCI) via the wireless access interface to one or more communications devices which form a group of communications devices, the DCI indicating whether each of the respective communications devices of the group is to transmit a channel measurement report (CMR), and
the controller circuitry is configured to control the receiver circuitry
to receive, in response to the transmitted DCI, a channel measurement report from the one or more of the communications devices of the group, the channel measurement reports being received from communications resources of the wireless access interface determined from the transmitted DCI,
wherein the DCI transmitted by the infrastructure equipment to the group of communications devices is a group common downlink control information (GC-DCI) comprising a plurality of indication fields, each of the plurality of indication fields indicating whether a corresponding one the communications devices in the group of communication devices is requested to transmit a channel measurement report.

* * * * *